Oct. 30, 1962 J. M. JACKSON ETAL 3,061,183
SPECIAL COUNTER MECHANISM FOR CASH REGISTERS
AND ACCOUNTING MACHINES
Filed April 7, 1961 6 Sheets—Sheet 1
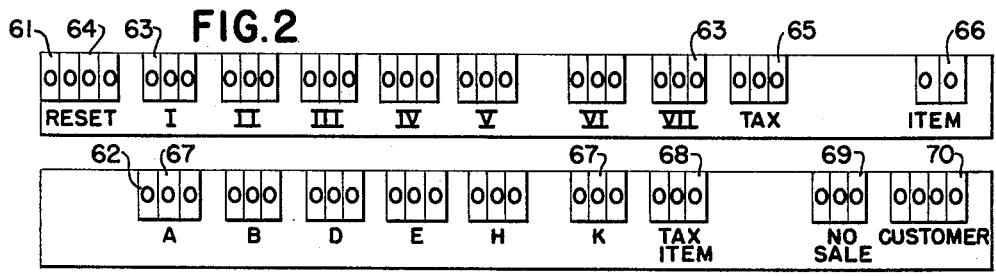
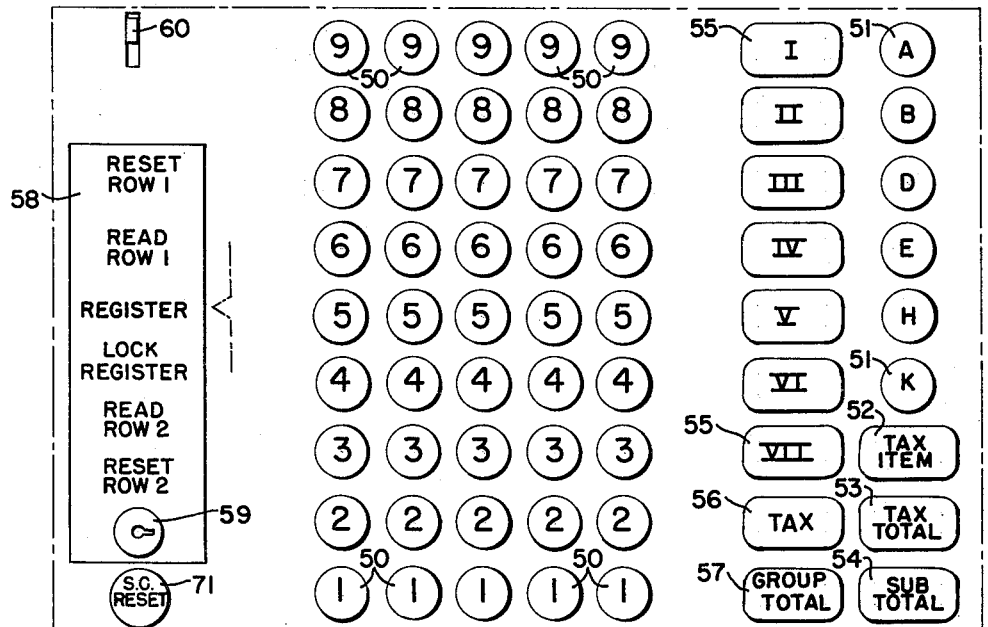
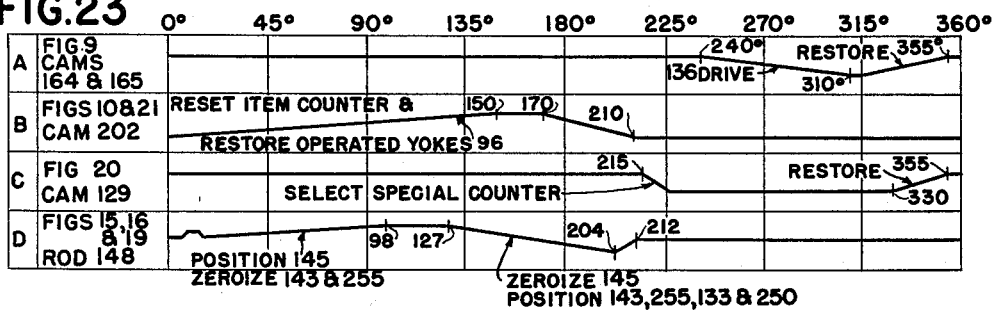
INVENTORS
JOHN M. JACKSON
HERBERT W. STEININGER
RICHARD H. BEEL &
FRANK R. WERNER
BY
THEIR ATTORNEYS

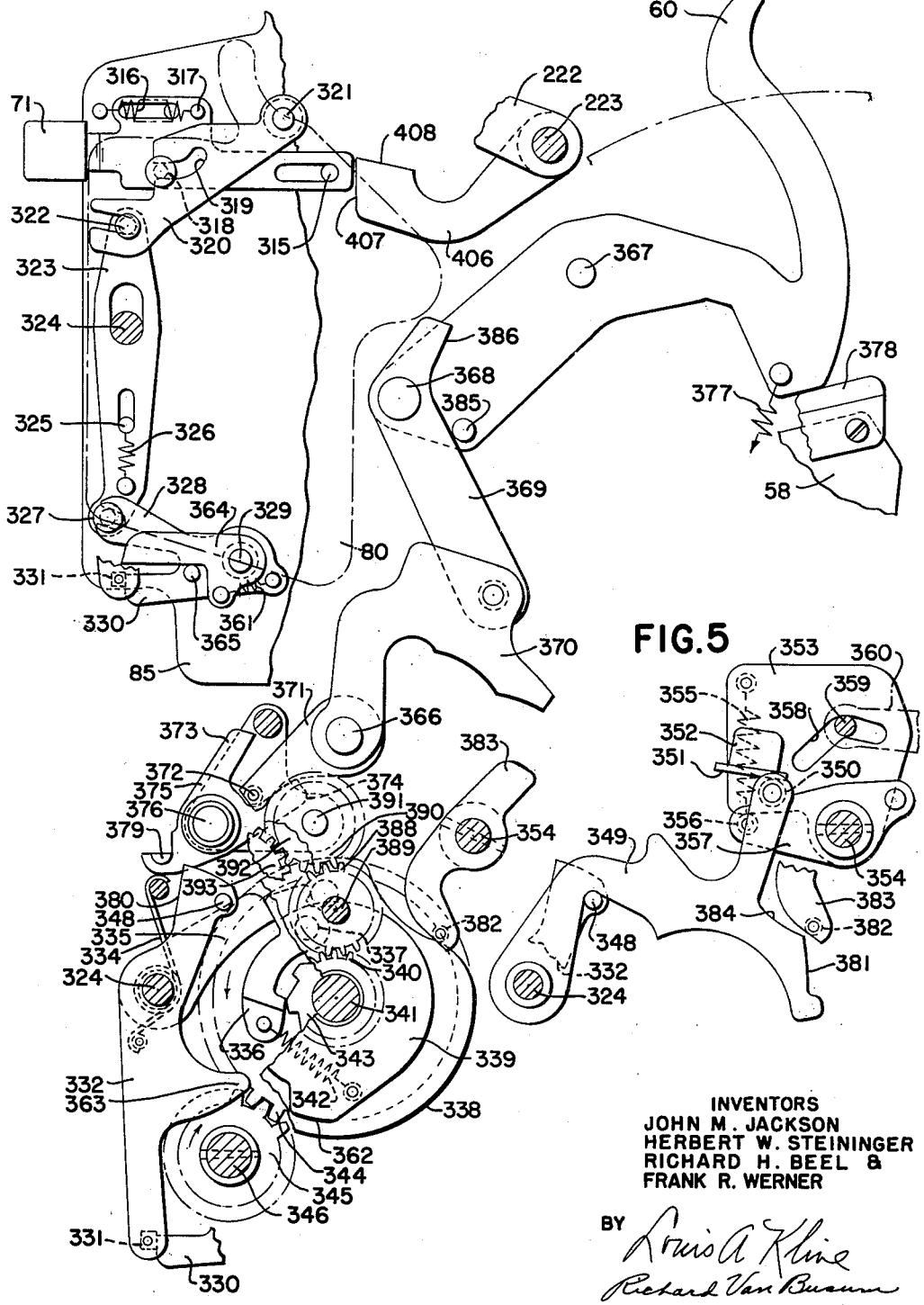

Oct. 30, 1962
J. M. JACKSON ETAL
3,061,183
SPECIAL COUNTER MECHANISM FOR CASH REGISTERS
AND ACCOUNTING MACHINES
Filed April 7, 1961
6 Sheets-Sheet 3
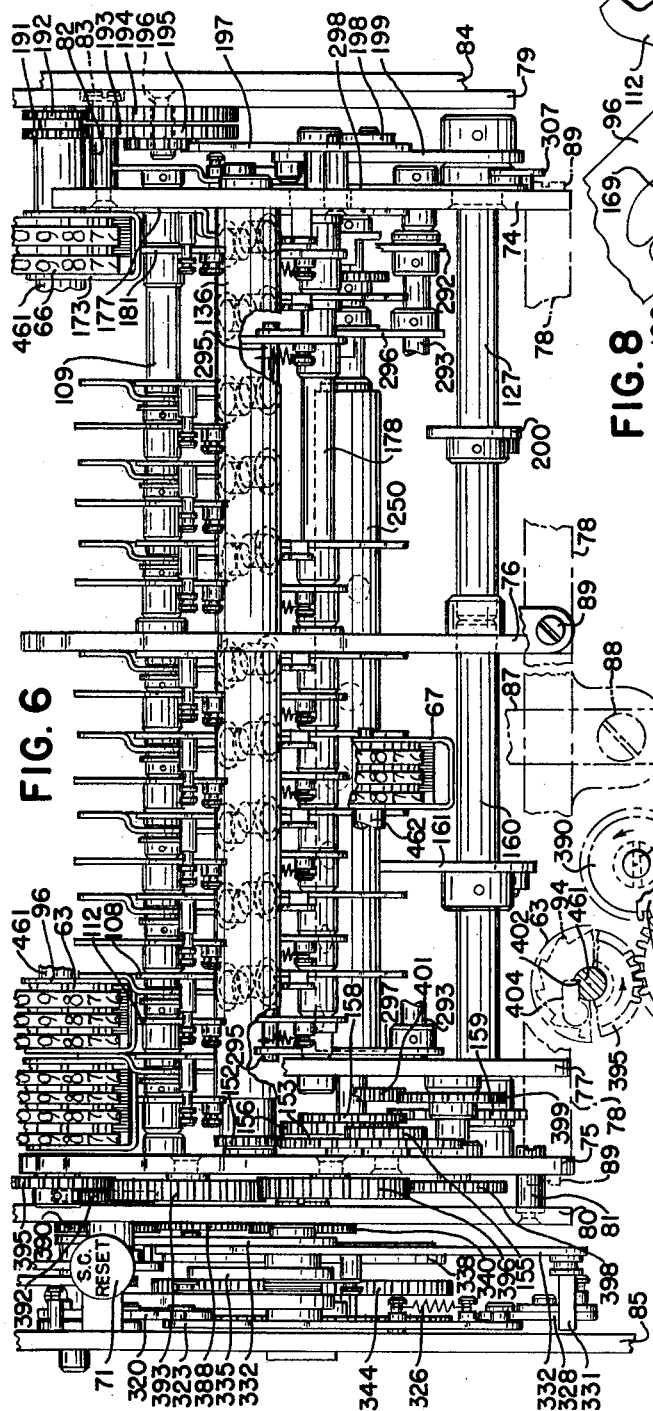
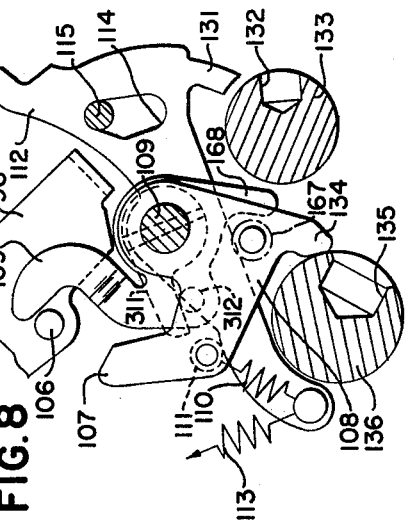
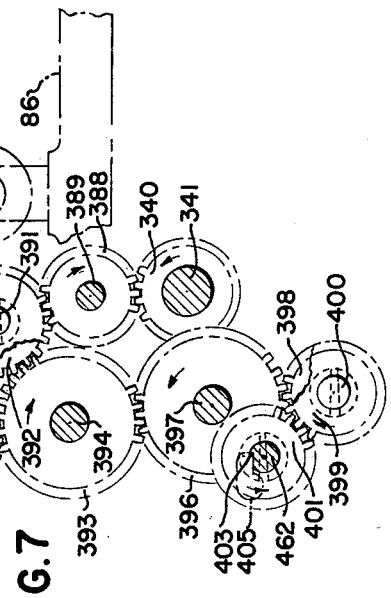
INVENTORS
JOHN M. JACKSON
HERBERT W. STEININGER
RICHARD H. BEEL &
FRANK R. WERNER
BY
*Louis A. Kline*
*Richard Van Buren*
THEIR ATTORNEYS Oct. 30, 1962 J. M. JACKSON ETAL 3,061,183
SPECIAL COUNTER MECHANISM FOR CASH REGISTERS
AND ACCOUNTING MACHINES
Filed April 7, 1961 6 Sheets-Sheet 4
FIG. 9
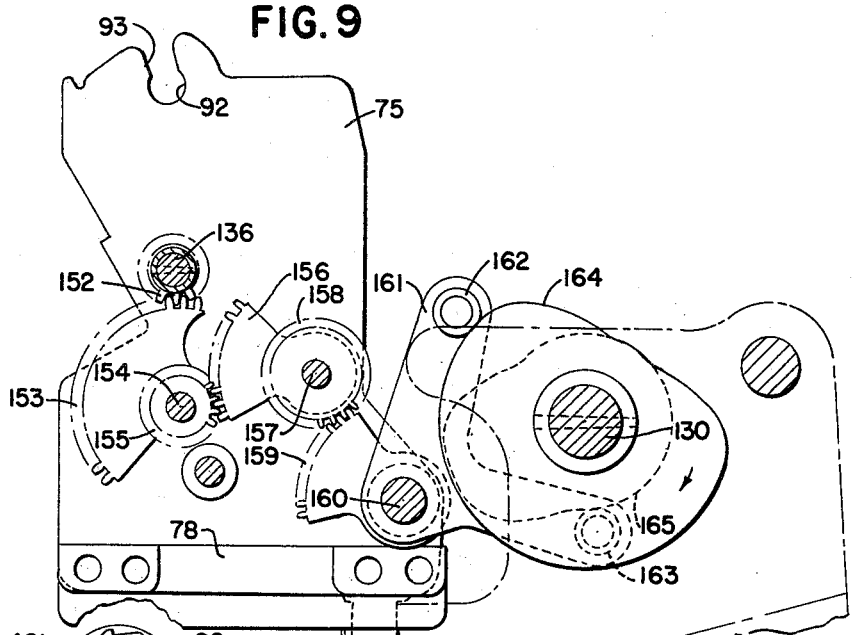
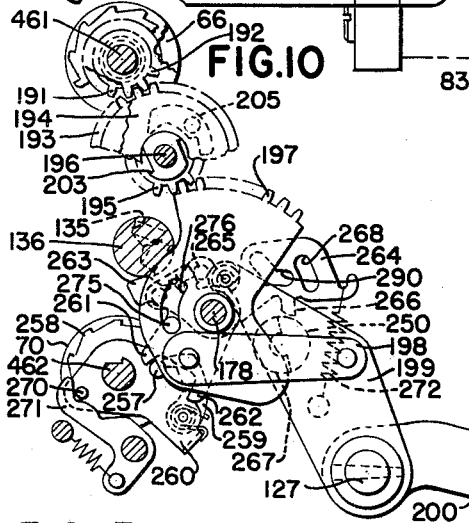
FIG. 10
FIG. 12
FIG. 13 FIG. 11
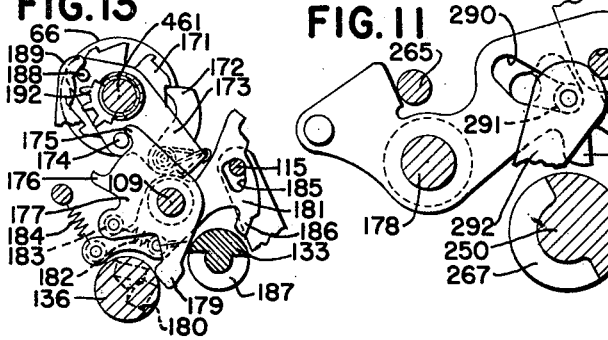
INVENTORS
JOHN M. JACKSON
HERBERT W. STEININGER
RICHARD H. BEEL &
FRANK R. WERNER
BY
Louis A. Kline
Richard Van Buren
THEIR ATTORNEYS

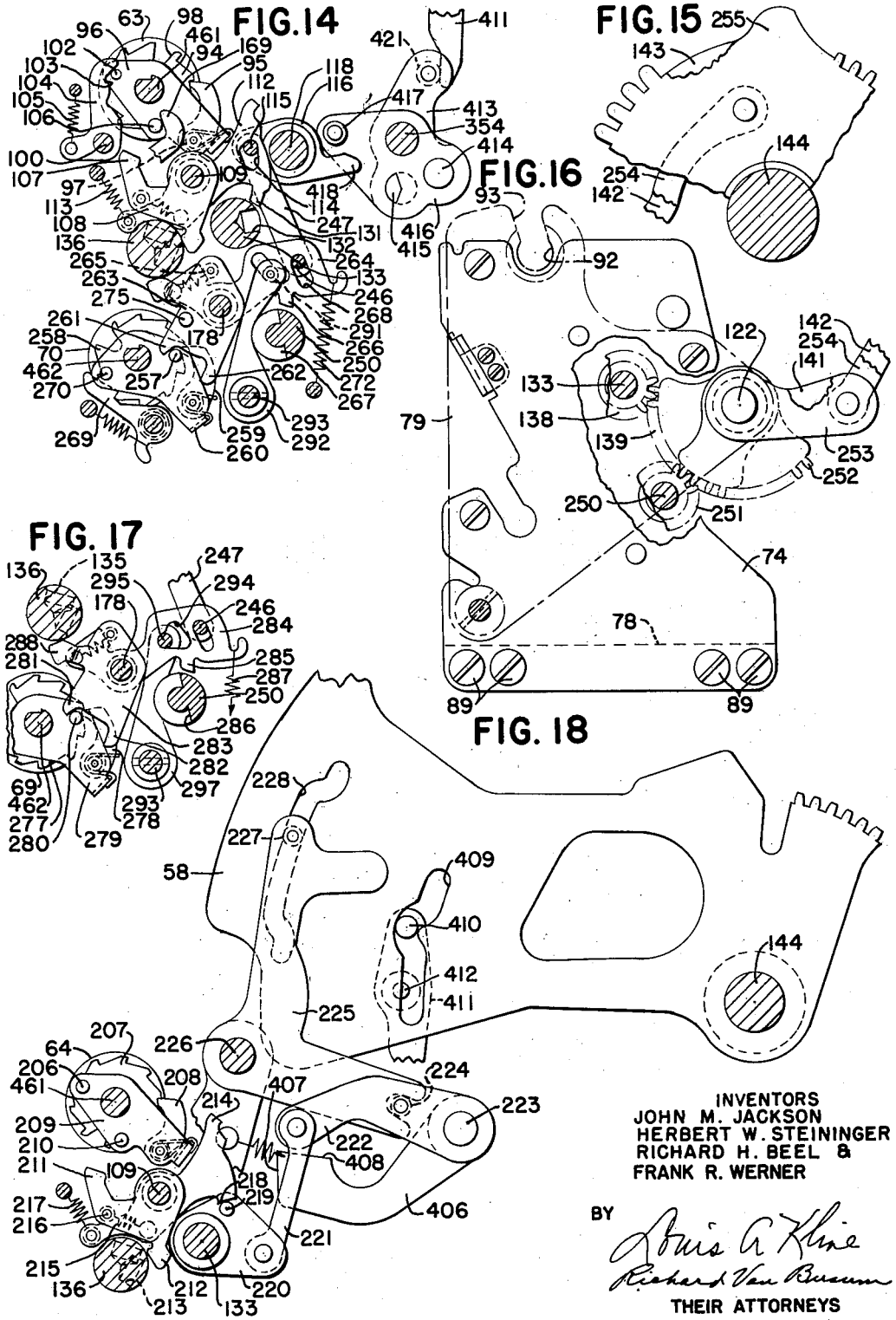

Oct. 30, 1962　　　J. M. JACKSON ETAL　　　3,061,183
SPECIAL COUNTER MECHANISM FOR CASH REGISTERS
AND ACCOUNTING MACHINES
Filed April 7, 1961　　　　　　　　　　6 Sheets-Sheet 6
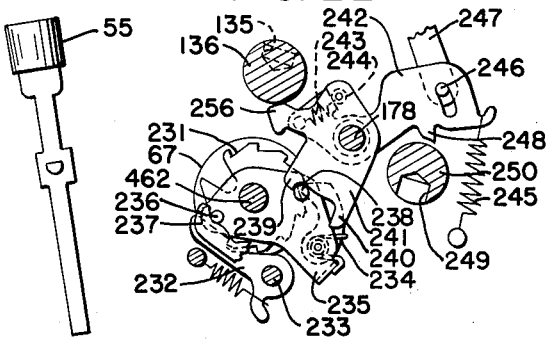
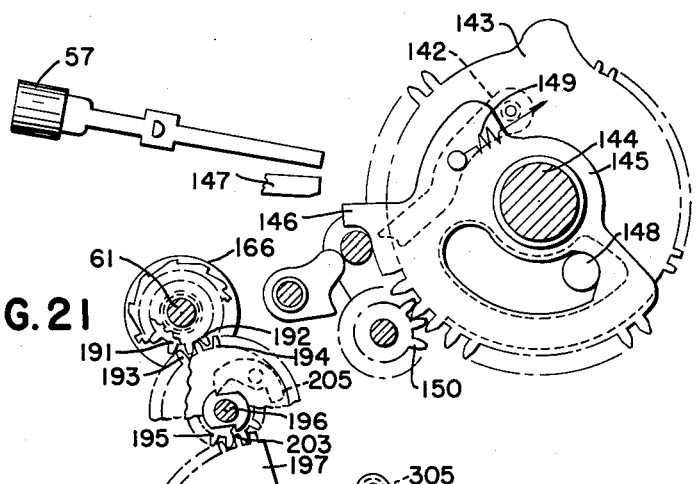
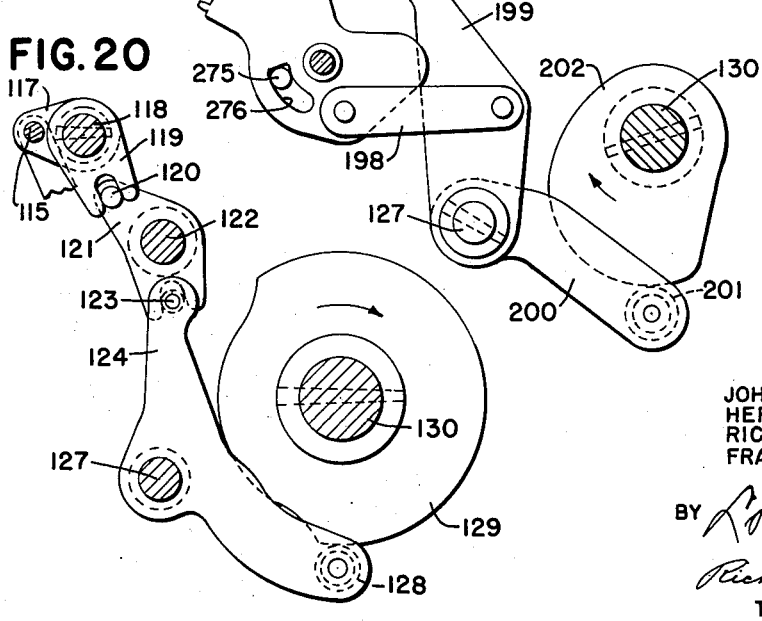
INVENTORS
JOHN M. JACKSON
HERBERT W. STEININGER
RICHARD H. BEEL &
FRANK R. WERNER
BY Louis A. Kline
Richard Van Buren
THEIR ATTORNEYS 3,061,183
SPECIAL COUNTER MECHANISM FOR CASH REGISTERS AND ACCOUNTING MACHINES
John M. Jackson, Herbert W. Steininger, Richard H. Beel, and Frank R. Werner, Dayton, Ohio, assignors to The National Cash Register Company, Dayton, Ohio, a corporation of Maryland
Filed Apr. 7, 1961, Ser. No. 101,442
8 Claims. (Cl. 235—6)

This invention relates in general to cash registers and accounting machines and is particularly directed to special counter devices for use in connection with such machines.

It is a general object of the present invention to provide an improved and expanded special counter mechanism for cash registers and similar accounting machines, for use in keeping an accurate count of the many items involved in the various transactions encountered in present-day complex business systems.

Another object is the provision of an improved special counter mechanism for cash registers and similar accounting machines, arranged in a unit which is readily removable from the machine, for adjustment and repair, said unit being compactly arranged so as to provide a maximum number of special counters in a minimum of space.

Another object is to provide means to control the selection of the various special counters.

A further object is the provision of improved means to operate the selected special counters.

Still another object is to provide novel mechanical means operating upon depression of a special key to reset the special counters to zero.

A further object is the provision of means whereby certain ones of the special counters may be arranged to keep a true net count of the items involved in a transaction, or a gross count of said items, whichever is desirable.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a diagrammatic view of the keyboard of the machine embodying the present invention.

FIG. 2 is a diagrammatic view of the two rows of special counters, which are located immediately beneath the amount keyboard.

FIG. 3 is a side elevation of a portion of the mechanism for resetting the special counters to zero.

FIG. 4 is a right side elevation of the key release lever for manually releasing depressed amount keys, and the clutch mechanism for connecting the operating motor to the special counter resetting mechanism.

FIG. 5 is a detail view of the switch-operating arm for controlling the operation of the motor in special counter resetting cycles of the machine.

FIG. 6 is a side-spacing view, as observed from the front of the machine, of the special counter mechanism.

FIG. 7 is a right side elevation of the gearing for connecting the special counter clutch mechanism to the special counter shafts, for resetting the special counters.

FIG. 8 is an enlarged detail view of a portion of the mechanism for selecting and operating one of the department special counters.

FIG. 9 is a right side view of the mechanism for driving the special counter operating shaft.

FIG. 10 is a detail view showing in particular the customer special counter and the item special counter, the selecting and operating mechanisms therefor, and the mechanism for resetting the wheels of the item special counter.

FIG. 11 is a detail view of the selecting lever and associated mechanism for the customer special counter.

FIG. 12 is a detail view of the mechanism for restoring the feed pawl and associated yoke for one of the department counters, from operated to unoperated position.

FIG. 13 is a detail view of the selecting and operating mechanism for the item special counter.

FIG. 14 is a detail view of the customer special counter and one of the department special counters and the selecting and operating means for said counters.

FIG. 15 is a fragmentary detail view of a portion of the differential mechanism for the Row 1 and Row 2 control keys.

FIG. 16 is a detail view showing the connection between the differential mechanisms for the Row 1 and Row 2 control keys and the selecting shafts for the special counters, for positioning said shafts according to the operated control keys.

FIG. 17 is a detail view of the no sale special counter and the selecting and operating mechanism therefor.

FIG. 18 is a detail view of the reset special counter, the selecting and operating mechanism therefor, and the means for connecting said selecting mechanism to the total control lever for operation thereby.

FIG. 19 is a right side elevation of the differential mechanism for the Row 2 control keys.

FIG. 20 is a detail view of the cam and connected mechanism for operating the special counter selecting mechanism.

FIG. 21 is a right side elevation of the item special counter resetting mechanism, showing said mechanism in operated condition.

FIG. 22 is a detail view of one of the clerks' special counters and the selecting and operating means therefor.

FIG. 23 is a time chart, depicting in graphic form the movements of the various mechanisms of the special counter mechanism.

*Machine in General, Including the Supporting Framework Therefor*

The machine chosen to illustrate the present invention is a well-known type of cash register or accounting machine of comparatively simple and compact design and of economical construction, but nevertheless comprising many of the appointments and features of more complex machines of larger dimensions and of more costly construction.

Machines of the above type are fully disclosed in United States Patents Nos. 2,880,930 and 2,962,209, issued to Frank R. Werner et al. on April 7, 1959, and November 29, 1960, respectively, to which reference may be had for a full disclosure of mechanism which is not pertinent to the present invention and which, for that reason, will be explained only in a general way herein.

The mechanism of the machine chosen to illustrate the present invention is mounted on and between right and left main side frames 84 and 85 (FIG. 6) in turn secured to a machine base 86, said side frames being supported in accurately-spaced relationship to each other by various cross frames, back frames, shafts, and rods, in the usual and well-known manner. The mechanism of the machine is enclosed in a suitable case or cabinet (not shown), which is in turn secured to the machine base. In certain applications the machine may be provided with a drawer cabinet (not shown) having cash drawers therein for use by the clerks in handling the cash receipts of their individual sales. The base 86 of the machine is secured in a metal pan, not shown, which rests on and is secured to the top surface of the drawer cabinet.

The keyboard of the present machine comprises five denominational rows of amount keys 50 (FIG. 1) and a Row 1 of transaction keys located on the extreme right-hand side of the keyboard and comprising six Clerks' keys 51, a Taxable Item key 52, a Tax-Total key 53, and a Sub-Total key 54. Located immediately to the left of the Row 1 control keys is a Row 2 of control keys comprising seven Department or Item keys 55, a Tax key 56, and a Group Total key 57. Located on the extreme left-hand side of the keyboard is a total control lever 58, often referred to as a "Unit Lock Lever," which is positionable to various positions to control the different functions of the machine. The total control lever 58 (FIG. 1) is provided with a lock 59, the keys of which are in the possession of authorized persons and may be used to lock said lever in certain positions so that it may not be manipulated by unauthorized persons.

Located above the total control lever 58 is a key release lever 60, which may be used to release any of the amount keys 50 prior to operation of the machine. Near the end of machine operation, the amount keys 50 are released automatically, as also are the depressed control keys in Row 1 or Row 2. The control keys of Row 1 and Row 2 are what are termed "motorized" keys, in that depression of any of these keys completes a circuit to a conventional type of operating motor (not shown) and simultaneously engages a clutch (not shown) inserted between said motor and the machine-operated mechanism, to cause the machine to be electrically operated. A hand crank (not shown) is provided for operating the machine manually under unusual circumstances, such as failure of the current supply, or for operating the machine slowly or intermittently during inspection or repair thereof.

The present machine is provided with two lines of interspersed totalizers (not shown) similar in every respect to those disclosed in the Werner et al. United States Patent No. 2,962,209. The totalizer lines comprise a lower, or No. 1, totalizer line, having thereon sets of interspersed totalizer wheels corresponding to the Row 1 control keys, and an upper, or No. 2, totalizer line, having thereon sets of interspersed totalizer wheels corresponding to the Row 2 control keys. In the present adaptation, the No. 1 totalizer line may have a maximum of five sets of interspersed totalizer wheels thereon, and the No. 2 totalizer line may have a maximum of nine sets of interspersed totalizer wheels thereon.

In the subject machine, the No. 1 totalizer line includes three sets of totalizer wheels—namely, a main itemizer, for temporarily accumulating non-taxable items; an auxiliary itemizer, for temporarily accumulating taxable items; and a taxable item totalizer, for accumulating a total of all taxable items. In the subject machine, the No. 2 totalizer line includes six sets of totalizer wheels, corresponding to the six Department or Item keys 55, for accumulating totals entered under control of these keys; a set of tax totalizer wheels, for accumulating a total of the tax items entered under control of the key 56; and a set of group totalizer wheels, for accumulating a grand total of all amounts cleared from the main item totalizer under control of the Clerks' keys 51.

The functions of the two lines of totalizers are controlled by the total control lever 58 (FIG. 1), and, when said lever is in Register position, as shown here, the totalizers on the No. 1 and No. 2 lines, with the exception of the main and auxiliary itemizers, are conditioned for adding operations. Moving the total control lever 58 to Lock Register position locks all of the keys against depression and thus prevents operation of the machine. Moving the total control lever to Read Row 1 position or Reset Row 1 position conditions the totalizers on the No. 1 line, with the exception of the main and auxiliary itemizers, for reading or resetting operations, respectively, which are often referred to as "sub-total" and "total" operations. Moving the total control lever 58 to Read Row 2 or Reset Row 2 position conditions the totalizers on the No. 2 line for reading or resetting operations, respectively, when the control keys in Row 2 are used to select corresponding sets of totalizer wheels on the No. 2 line for reading or resetting operations.

The machine of the instant invention is at present arranged for use by supermarkets and similar businesses for checking out goods purchased by customers, and is accordingly so arranged that every transaction is what is termed a "multiple-item transaction," comprising one or more item-entering operations and a final item total operation, regardless of whether one or more items are involved in the transaction.

Each row of keys, including the Row 1 and Row 2 control keys and the five rows of amount keys, is provided with a differential mechanism similar to that shown in FIG. 19 for the Row 2 control keys, and said differential mechanisms are positionable under control of their corresponding keys to in turn position the corresponding front and back indicators (not shown) and corresponding type wheels (not shown) to indicate and register the data set upon said keys. The differential mechanisms for the amount keys 50 coact with the wheels of the selected totalizers on the No. 1 and No. 2 totalizer lines, to enter therein the values set up on said keys, in item-entering operations.

In reading and resetting operations, under control of the total control lever 58 (FIG. 1), the amount keys 50 are locked against depression, and the selected set of totalizer wheels is reversely rotated to zero by the amount differential mechanisms for said amount keys, to position the corresponding indicators and printing wheels accordingly, to cause the amount read or reset from the wheels of the selected totalizer to be visually indicated and recorded.

The differential mechanism shown in FIG. 19 for the Row 2 control keys will be described in detail later herein, and, for a more complete description of the differential mechanisms for the amount keys 50, reference may be had to the Werner et al. United States Patent No. 2,880,930.

The instant machine also includes two rows of special counters, which are the step-by-step or increment type, are located immediately beneath the rows of amount and transaction keys, and comprise an upper row of special counters, indicated generally by the reference numeral 61 (FIG. 2), and a lower row of special counters, indicated generally by the reference numeral 62. The wheels of the upper and lower rows of special counters 61 and 62 are visible through corresponding openings in the machine case or cabinet, for the purpose of sight-reading the numerals on said wheels. The upper row of special counters 61 comprises seven sets of wheels 63, corresponding to the seven Department or Item-entering keys 55 (FIG. 1), each set of wheels comprising three denominational wheels having a maximum capacity of 999. The upper row of special counters also includes a reset counter 64, having four denominational wheels; a tax counter 65, having three denominational wheels; and an item counter 66, having two denominational wheels.

The counters 63, 64, and 65, in the upper row, may be what is termed either "Net" count or "Item" count, at the option of the purchaser, to properly adapt the machine for use in his particular business system. When Net count construction is provided, the units wheels of the selected counters advance only one increment to count "one" for each complete transaction, which may include one or more item-entering operations, a taxable total operation, a tax operation, and a final item total operation. When Item count construction is provided, the units wheels of the selected counters count "one" for each operation of the machine. In other words, if Net count construction is provided for the special counters 63, the first time one of the Department keys 55 (FIGS.

1 and 2) is used in an item-entering operation, the units wheel of the corresponding special counter 63 is advanced one increment during this operation, and use of that same key in further item-entering operations does not cause the corresponding special counter 63 to be operated. If the special counters 63 in the upper row are arranged for Item count, then the units wheels of said counters are advanced one increment each time the corresponding key is used in an item-entering operation. The special counters 63 are arranged for Net count in the present adaptation.

The reset counter 64 (FIG. 2) may also be arranged for either Net count or Item count and is at present arranged for Net count, in which the units wheel of said counter is advanced one increment, under control of the total control lever 58 when moved to either Reset 1 or Reset 2 position and the machine is operated to reset a selected totalizer on the No. 1 or No. 2 totalizer line. In subsequent reset operations, the reset counter 64 is not operated. If the reset counter 64 is arranged for Item count, its units wheel is advanced one increment for each reset operation performed under control of the total control lever 58, when in either Reset 1 or Reset 2 position. The tax counter 65 may be either Net or Item count construction and is at present arranged for Item count under control of the tax key 56.

The item counter 66 (FIG. 2) is here arranged to count all of the operations in each multiple-item transaction, and, to obtain this result, its units wheel is advanced one increment for each of said operations. In the final item total operation of each multiple-item transaction, mechanism is rendered effective which restores the wheels of the item counter 66 to zero position, in preparation for the next multiple-item transaction.

The lower row 62 of special counters comprises six special counters 67, each having three denominational wheels corresponding to the six Clerks' keys 51 in Row 1, a taxable item special counter 68, having three denominational wheels and corresponding to the Taxable Item key 52 in Row 1, a no-sale special counter 69, having three wheels, which operates under control of the keys 51 in Row 1, when said keys are used after the final item total operation of a multiple-item transaction and before the entering of the first item in a succeeding multiple-item transaction, as will be explained later. The lower row of special counters also includes a customer counter 70, having four denominational wheels, which operates under control of Clerks' keys 51 in Row 1, in the final item total operation of a multiple-item transaction, to keep count of the customers served.

All of the special counters in the lower row 62 are Item count type of counters and cannot be arranged for Net count.

Automatic means, operable upon depression of a special counter reset key 71 (FIGS. 1 and 3), located on the left-hand side of the keyboard, is provided for automatically resetting all of the special counters to zero, with the exception of the reset counter 64 and the item counter 66. The special counter 64 is not resettable, and the item counter 66 is automatically conditioned for resetting at the end of each multiple-item transaction, as explained before.

In some adaptations of the machine, the automatic special counter resetting mechanism is omitted, and manual means (not shown) is provided for setting the special counters to zero.

Inasmuch as the present invention is directed particularly to the special counter mechanism, this mechanism, and the mechanism of the machine associated therewith, will be described in detail in the ensuing pages. Other mechanism of the machine, which is not pertinent to the present invention, will be described only in a general manner hereinafter, and, if a more detailed description of said mechanism is desired, reference may be had to the Werner et al. patents referred to hereinbefore for a full disclosure of said mechanism.

*Detailed Description of Special Counter Mechanism*

The major portion of the special counter mechanism is mounted in or between the frames of a special counter framework (FIG. 6), which is located at the front of the machine, directly beneath the keyboard, said framework being readily removable as a unit by the withdrawal of several screw studs for the convenient replacement, inspection, or repair of said special counter mechanism whenever necessary or desirable.

The framework for the special counter mechanism comprises companion right and left special counter frames 74 and 75 (FIGS. 6 and 16), a central frame 76, and a left auxiliary frame 77, said frames being secured in fixed relationship with each other by a special counter base plate 78 and various bars, shafts, and rods, as will be explained more in detail later. The framework, comprising the frames 74 and 75 (FIG. 6) is mounted between right and left support plates 79 and 80 by means of studs 81, secured in said plate 80 and engaging holes in the left frame 75, and by means of studs 82, extending between the right frame 74 and said plate 79 and secured in place by screws 83. The right support plate 79 is secured to the inner surface of the main right frame 84, and the left support plate 80 is secured to the main left frame 85 by means of studs (not shown) extending between said plates and said frames. The lower ends of the main frames 84 and 85 are secured to the machine base 86, said base having extending upwardly therefrom a bracket 87, to which the center of the special counter base plate 78 is secured by a screw 88. The plate 78 (FIG. 6) is secured to the lower ends of the frames 74, 75, 76, and 77 by screw studs 89 (FIGS. 6 and 15).

The upper row 61 of special counter wheels are mounted on a special counter shaft 461 (FIGS. 6, 9, and 16), journaled in bushings mounted in axially-alined borings 92 in the frames 75 and 76 and the plate 79. The shaft 461 and the wheels mounted thereon are removable as a unit from the special counter framework by sliding the bushings out of the borings 92 and lifting the shafts through slots 93, which extend outwardly from said borings. The lower row 62 of special counter wheels are mounted on a special counter shaft 462, removably mounted, similarly to the shaft 461, in the frames 74, 76, and 77 (FIG. 6).

*Department Special Counter*

Inasmuch as the constructions of each of the special counters in the upper and lower rows 61 and 62 are similar in every respect, it is believed that a detailed description of a representative one of said counters in each of said rows will be sufficient for the present purpose. Therefore, the department special counter, shown best in FIGS. 8, 12, and 14, will now be described as representative of all of the department counters on the upper shaft or line 461.

Each of the three wheels 63 of the department counter being described (FIGS. 8, 12, and 14) has, integral therewith, a ratchet 94, the teeth of which coact with a corresponding one of three graduated teeth in a feed pawl 95, free on a stud extending between the parallel arms of a pawl-operating yoke 96 free on the shaft 461. A spring 97 urges the pawl 95 inwardly, or counter-clockwise, to cause the teeth therein to yieldingly engage their corresponding ratchets 94. Each of the ratchets 94 (FIG. 14) has a notch 98, located at the zero position of said ratchet, which permits the corresponding tooth of the pawl 95 to drop inwardly, under influence of the spring 97, so that the tooth of the pawl 95 for the adjacent higher order wheel 63 will engage the corresponding ratchet and advance said wheel one tooth space, as the lower order wheel is being moved from nine to zero position, to effect a transfer of tens digits from lower to higher denominational orders, as is customary and usual with this type of counter. Coacting with the teeth of each of the ratchets 94 (FIG. 12) is a retaining pawl 99 free on a rod 100 supported by the special counter framework, said pawls being urged clockwise by springs 101 into yielding engagement with said ratchet teeth to yieldingly retain said ratchets and corresponding wheels 63 in the position to which they are moved by the feed pawl 95, to aline the numerals on said wheels with the sight-openings in the machine case.

The yoke 96 (FIG. 14) for the special counter being described is retained in either its operated position or its restored position through the medium of a stud 102, carried thereby, in cooperation with two retaining notches 103 in a yoke-retaining pawl 104 free on the rod 100 and urged clockwise by a spring 105 to normally maintain said notches in yielding engagement with the said stud 102. The yoke 96 (FIGS. 8 and 14) carries a stud 106, which coacts with a finger 107 on a special counter operating arm 108 free on a shaft 109 journaled in the special counter framework. A spring 110, tensioned between a stud 111 in the arm 108 and a stud in a selecting lever 112 free on the shaft 109, urges said arm and said lever towards each other to normally maintain said stud 111 in yielding engagement with said lever 112.

A spring 113 urges the lever 112 clockwise to normally maintain the upper end of a slot 114 in an inward extension thereof in yielding engagement with a rod 115 supported by cranks 116 and 117 (FIGS. 14 and 20) in turn secured to a shaft 118 journaled in the special counter framework. Also secured on the shaft 118 is a crank 119 having a slot which engages a stud 120 in the upper end of a lever 121 free on a shaft 122 journaled in the special counter framework. A downward extension of the lever 121 has a slot which engages a stud 123 in an upward extension of a lever 124 free on a shaft 127 journaled in the special counter framework. A downward extension of the lever 124 carries a roller 128, which cooperates with the periphery of a plate cam 129 secured on a main cam shaft 130 journaled in the main frames of the machine.

The cam 129 and the shaft 130 make one clockwise revolution (FIG. 20) each machine operation, and during this revolution the periphery of said cam 129, coacting with the roller 128, rocks the lever 124 first counter-clockwise, which, through the lever 121, rocks the crank 119, the shaft 118, the cranks 116 and 117, and the rod 115 also counter-clockwise, according to the time given in space C, FIG. 23. The spring 113 (FIGS. 8 and 14) moves the lever 112 clockwise in unison with the rod 115, causing a tooth 131, extending downwardly from said lever 112, to sense for a corresponding counterbore 132 in a selecting shaft 133 journaled in the machine framework and engage said counterbore when it is positioned opposite said tooth under control of the differential mechanism for the Row 2 control keys, as will be explained presently. Clockwise movement of the lever 112 (FIGS. 8 and 14), upon engagement of the tooth 131 with the counterbore 132, through the stud 111, carries the arm 108 clockwise in unison therewith, thus permitting a tooth 134, extending downwardly from said arm 108, to be engaged by a counterbore 135 in an operating shaft 136, journaled in the special counter framework.

Initial movement counter-clockwise of the shaft 136 causes the counterbore 135, coacting with the tooth 134, to rock the arm 108 clockwise, against the action of the spring 110, causing the finger 107 to engage the stud 106 and rock the yoke 96 counter-clockwise. Counter-clockwise movement of the yoke 96 (FIGS. 12 and 14) causes the pawl 95, coacting with the teeth of the ratchet 94, to rotate said ratchet and the corresponding units counter wheel one step counter-clockwise to count the item entered under control of the corresponding Department key 55 in Row 2 (FIG. 1). Return movement clockwise of the shaft 136 restores the arm 108 and the lever 112 counter-clockwise to normal position.

The selecting shaft 133 for the upper row 61 of special counters is positioned under influence of the differential mechanism for the Row 2 control keys, and said shaft 133 (FIGS. 16 and 19) has secured near its right end a pinion 138, which meshes with a segment 139 free on the shaft 122. Integral with the segment 139 is a crank 141, having pivoted thereto the lower end of a link 142, the upper end of which is pivotally connected to a secondary differential member 143 (FIGS. 15 and 19) for the Row 2 control keys, said member being rotatably supported on a differential shaft 144 journaled in the machine framework. Associated with the secondary differential member 143 (FIG. 19) is a companion primary differential member 145, free on the shaft 144 and having a projection 146 arranged to engage the lower ends of the stems of the Row 2 control keys 55, 56, and 57, when any one of said keys is depressed, to position the primary differential member 145 accordingly. Also engageable by the projection 146 is a zero stop plunger 147, which is effective, when no key is depressed in Row 2, to stop the primary differential member 145 in zero position.

The positioning movement of the primary and secondary differential members is controlled by a leading rod 148, which extends through arcuate slots formed in said primary and secondary members. A spring 149 urges the primary member 145 clockwise to normally maintain the rear end of the slot in said member in yielding contact with said leading rod 148. The leading rod 148 is rocked first clockwise and then back to normal position through an angle of approximately 80 degrees during each machine operation, according to the time given in space D, FIG. 23, and as fully described in the Werner et al. United States Patent No. 2,880,930. During initial movement clockwise of the rod 148, the spring 149 causes the primary differential member 145 to follow in unison therewith until the projection 146 strikes the inner end of the stem of the depressed key 55, 56, or 57 to position said primary differential member accordingly. Also during its initial movement clockwise, the rod 148 engages the forward end of the slot in the secondary differential member 143 and restores said member from its preset position to zero position, prior to positioning of said secondary member by the primary member.

After the primary differential member has been positioned and the secondary member returned to zero, as explained above, and prior to return movement counter-clockwise of the leading rod 148, a clutch pinion 150 (FIG. 19), for the Row 2 control keys, is engaged with teeth on the periphery of said primary and secondary members to lock said members together for concert movement, whereupon return movement of the rod 148 causes said rod to engage the inner end of the slot in the primary differential member 145 and restore said member from the position in which it was set by the depressed control key, to zero position, as shown in FIG. 19, to transmit the positioning of said primary member to the secondary member 143. The positioning of the secondary member 143 is transmitted through the link 142 to the crank 141 and the segment 139 (FIG. 16) and from said segment to the pinion 138 and the shaft 133, to position the counterbore 132 in said shaft, corresponding to the depressed control key, opposite the tooth 131 on the lever 112, to select the corresponding special counter for operation, upon actuation of the special counter drive shaft 136. The shaft 133 remains positioned at the end of machine operation and is restored to normal position in the beginning of the next machine operation.

The special counter drive shaft 136 (FIGS. 6, 8, and 9)

is driven by a pinion 152, secured thereon, which meshes with a gear sector 153, free on a stud 154 fast in the frame 75 and having integral therewith a pinion 155, which meshes with a segment 156 free on a stud 157 in said frame 75. Integral with the segment 156 is a gear 158, which meshes with a segment 159 fast on a shaft 160 (FIGS. 6 and 9) journaled in the frames 75, 76, and 77, in axial alinement with the shaft 127. Also secured on the shaft 160 is a lever 161 carrying rollers 162 and 163, which cooperate, respectively, with companion plate cams 164 and 165, secured on the main cam shaft 130.

As explained before, the main cam shaft 130 makes one clockwise revolution each machine operation, and after about 218 degrees of movement said shaft 130 and the cams 164 and 165 rock the lever 161 and the segment 159 first clockwise and then back to normal position, as indicated graphically in space A, FIG. 23. Clockwise movement of the lever 161 (FIG. 9), through the train of gearing shown here, rocks the special counter operating shaft 136 first counter-clockwise, causing the counterbore 135 (FIGS 8 and 14) to engage the tooth 134 of the operating arm 108, and rock said arm clockwise against the action of the spring 110. Clockwise movement of the arm 108 causes the finger 107 to engage the stud 106 and rock the yoke 96 counter-clockwise, from the position shown in FIG. 8 to the position shown in FIG. 12, causing the pawl 95 to advance the units wheel of the selected department counter 63 one step to count the department corresponding to the depressed Department key 55 in Row 2. The yoke 96 remains in operated condition, as shown in FIG. 12, being yieldingly held in place by the retaining pawl 104 (FIG. 14), as the department special counters are of the Net count construction and operate only once during a multiple-item transaction, to count the first operation of the corresponding Department key 55 and therefore do not count subsequent operations of said key in said transaction.

In adapting the machine to certain business systems, it may be desirable to have one or more of the department special counters of Item count construction, in which they operate to count "one" each time the corresponding Department key 55 is operated in a multiple-item transaction, and this result is accomplished in the following manner. Return movement clockwise of the shaft 136 (FIG. 8), near the end of machine operation, restores the arm 108 counter-clockwise, causing a stud 167, carried by said arm 108, to engage a downward projection 168 of an arm 169, free on the shaft 109, and rock said arm counter-clockwise. This causes an upward extension of said arm to engage the stud 106 in the yoke 96 and return said yoke clockwise from its operated position, as shown in FIG. 12, to its unoperated position, as shown in FIGS. 8 and 14. In the present arrangement of the department special counters, the stud 167 is omitted; consequently return movement counter-clockwise of the arm 108 has no effect on the arm 169, and consequently the yoke 96 remains in operated condition.

In the final item total operation of a multiple-item transaction, a condition is set up, under control of the Clerks' keys 51 (FIG. 1), which causes all advanced or operated Net count special counters to be restored to unoperated condition in the beginning of the succeeding operation and prior to the time that said counters are to be operated in said succeeding operation, as will be explained later.

*Item Special Counter*

The upper row 61 of special counters (FIGS. 2 and 13) includes the item counter 66, which counts "one" each time any one of the Department keys 55 (FIG. 1) is used to initiate an item-entering operation, and also counts "one" for each time the Tax key 56 is used to enter the amount of the tax on taxable items. The item counter 66 has two wheels, each carrying a ratchet 171 (FIG. 13), the teeth of which are arranged to be engaged by the corresponding teeth of an operating pawl 172 mounted between the arms of a yoke 173 free on the special counter shaft 461. The yoke 173 carries a stud 174, which coacts with similar projections 175 and 176 formed on the upper end of a special counter operating arm 177 free on the shaft 109. Projecting downwardly from the arm 177 is a tooth 179 arranged to coact with an operating counterbore 180 in the special counter operating shaft 136, in exactly the same manner as explained for the arm 108 (FIG. 8) for the department special counter, described above. Associated with the arm 177 is a companion special counter selecting lever 181, also free on the shaft 109. A spring 182, tensioned between a stud 193 in the arm 177 and a stud in the lever 181, urges said parts toward each other to normally maintain said stud 183 in yielding engagement with an upper surface of said lever 181. A spring 184 urges the lever 181 clockwise to normally maintain the upper end of a slot 185 therein in yielding engagement with the rod 115. The selecting lever 181 has a depending tooth 186 arranged to coact with a slot 187 formed in the selecting shaft 133, said slot corresponding to the positioning of said shaft under control of the Department keys 55 and the Tax key 56 (FIG. 1), so that the item counter will be selected for operation each time any one of these keys is used during a multiple-item transaction.

Positioning of the shaft 133, under control of the keys 55 and 56, through the differential mechanism disclosed principally in FIGS. 16 and 19, causes the slot 187 to be positioned opposite the tooth 186, whereupon initial movement downwardly of the rod 115, as explained earlier in connection with FIG. 14, permits the tooth 186 to enter said slot, and the lever 181 and the arm 177 to be simultaneously rocked clockwise under action of the spring 184. This permits the tooth 179 of the arm 177 to engage the counterbroe 180, upon initial movement counter-clockwise of the shaft 136, thus rocking said arm 177 clockwise against the tension of the spring 182. This causes the projection 176 to engage the stud 174 and rock the yoke 173 and the pawl 172 counterclockwise to advance the units item counter wheel 66 one step each time one of the keys 55 or 56 is used during a multiple-item transaction. Return movement clockwise of the shaft 136, after the item counter has been operated, returns the arm 177 counter-clockwise, causing the projection 175 to engage the stud 174 and return the yoke 173 and the pawl 172 to unoperated position, as shown in FIG. 13, in preparation for another item-counting operation.

Like the department special counter, shown in FIGS. 8, 12, and 14 and explained earlier, each of the ratchets 171 for the two item-counting wheels 66 has associated therewith a retaining pawl (not shown), similar to the retaining pawl 99 (FIG. 12), for yieldingly retaining the wheels in set positions. Likewise, the yoke 173 (FIG. 13) has a stud 188, which coacts with retaining notches formed in the upper end of a retaining pawl 189, similar to the pawl 104 (FIG. 14) for the department counter, for yieldingly retaining said yoke 173 in either its operated position or its unoperated position.

As previously explained, every transaction performed by the machine embodying the present invention is necessarily a multiple-item transaction, consisting of one or more item-entering operations, under control of the Department keys 55 (FIG. 1), in some cases a taxable total operation and a tax-entering operation, and a final item total operation, under control of the Clerks' keys 51. In addition, other operations, such as No Sale and totalizer reading and resetting operations, may be performed. In the final item total operation of a multiple-item transaction, a condition is set up which causes the two wheels 66 of the item counter to be reset to zero position in the succeeding operation of the machine.

Referring to FIGS. 6, 10, and 13, the units item counter wheel 66 is connected by a sleeve to a companion pinion 191, said sleeve bearing on the outer circumference of another sleeve, which connects the tens item counter wheel 66 to a companion pinion 192, said latter sleeve being rotatably supported on the upper special counter shaft 461. The pinions 191 and 192 mesh, respectively, with companion gears 193 and 194, rotatably supported on the hub of a pinion 195 free on a stud 196 secured in the frame 79, said latter pinion meshing with the teeth of a gear segment 197 free on a shaft 178. A link 198 pivotally connects the segment 197 to an arm 199 secured on the shaft 127, as also is a crank 200 carrying a roller 201, which coacts with the periphery of an item counter reset cam 202 secured on the main cam shaft 130.

In the first machine operation following the final item total operation of a multiple-item transaction, rotation of the shaft 130 and the cam 202 from normal or home position, as shown in FIG. 10, causes said cam, in cooperation with the roller 201, to rock the crank 200, the shaft 127, and the arm 199 first clockwise from the position shown here to the position shown in FIG. 21, according to the time given in space B, FIG. 23. Clockwise movement of the arm 199, through the link 198, rocks the segment 197 counter-clockwise, causing said segment to rotate the pinion 195 clockwise, during which rotation one or the other of two diametrically-opposed shoulders 203, formed on the hub of said pinion 195, engages pawls 205, one of which is carried by each of the gears 193 and 194, and rotates said gears clockwise in unison therewith. Clockwise movement of the gears 193 and 194 rotates the corresponding pinions 191 and 192 and their corresponding item counter wheels 66 counter-clockwise, to reset said wheels to zero in the beginning of machine operation and prior to selection of any of the special counters in the upper row 61 for operation.

The crank 200 (FIG. 21), the shaft 127, the arm 199, and connected mechanism remain in operated condition until the final item total operation of the next multiple-item transaction and are then restored to normal, or unoperated, condition, (as shown in FIG. 10), as will be explained later.

*Reset Special Counter*

Located on the left-hand end of the upper row 61 of special counters (FIG. 2) is the Net type of reset counter 64, which counts "one" for the first operation performed with the total control lever 58 (FIG. 1) in either Reset Row 1 or Reset Row 2 position. Like the department counters, the reset counter becomes inoperative after operating once and is restored to operative condition in the next item total operation.

The four wheels of the reset counter 64 are straddled by the parallel arms of a yoke 209 (FIG. 18) free on the shaft 461, said yoke carrying a pawl 208, which is spring-urged into engagement with ratchets 207 carried by each of the reset counter wheels 64. Retaining pawls (not shown), similar to the pawls 99 (FIG. 12) for the department counters, are provided for each of the ratchets 207 and coact with the teeth of said ratchets, as explained before, to hold said ratchets and their corresponding wheels in set position. Also, a retaining pawl (not shown) similar to the retaining pawl 104 (FIG. 14) is provided for coaction with a stud 206, carried by the yoke 209, to yieldingly retain said yoke in either operated or unoperated condition. The left arm of the yoke 209 (FIG. 18) carries a stud 210, arranged to coact with a finger of a special counter operating arm 211, free on the shaft 109 and having a depending tooth 212, which coacts with a corresponding counterbore 213 in the special counter operating shaft 136. Associated with the operating arm 211 is a companion selecting lever 214, free on the shaft 109 and flexibly connected to said arm 211 by a spring 215, which is tensioned between a stud in said lever 214 and a stud 216 in said arm 211, to normally maintain said stud 216 in yielding engagement with the top surface of said selecting lever 214. A spring 217 (FIG. 18) urges the lever 214 clockwise to normally maintain a depending tooth 218 thereon in yielding engagement with a stud 219 in a crank 220 free on the shaft 133. The crank 220 is pivotally connected by a link 221 to an arm 222 free on a stud 233 in the left main frame and carrying a stud 224 engaged by a slot in an arm of a bell crank 225 free on a rod 226 mounted in the machine framework.

The bell crank 225 carries a stud 227, which extends into a cam slot 228 formed in the total control lever 58 near its outer edge and having, in its center, a concentric portion with two similar inwardly-extending cam branches at either end thereof. The upper branch of the slot 228 corresponds to the Reset Row 1 position of the total control lever 58 (FIG. 1), and the downward branch of said slot corresponds to the Reset Row 2 position of said total control lever 58. Moving said total control lever 58 to either Reset Row 1 or Reset Row 2 position causes the slot 228, in cooperation with the stud 227, to rock the bell crank 225 clockwise. Clockwise movement of the bell crank 225 rocks the arm 222 counter-clockwise, which, through the link 221, rocks the crank 220 and the stud 219 clockwise, whereupon the spring 217 causes the lever 214 and the arm 211 to move clockwise in unison therewith to cause the tooth 212 to engage the counterbore 213 in the operating shaft 136, upon initial movement counter-clockwise of said shaft. Initial movement of the shaft 136 rocks the operating arm 211 clockwise, causing its upwardly-extending finger to engage the stud 210 and rock the yoke 209 and the pawl 208 counter-clockwise to advance the units reset counter wheel 64 one increment or step of movement.

As is the case with all of the special counters, the pawl 208 (FIG. 18) has thereon graduated teeth which coact with the ratchets 207 for each of the four order wheels of the reset special counter 64, and, when a lower order wheel passes from 9 to 0, a notch in the corresponding ratchet 207 permits the tooth for the adjacent higher order wheel to enagge the corresponding ratchet to transfer a tens digit from the lower order wheel to the higher order wheel, as is usual with this type of counter.

The reset counter 64 (FIG. 18) is a Net type of counter, and, like the department counters 63, explained before, its yoke 209 and its pawl 208 remain in operated condition, after having been once operated, until the final item total operation of a multiple-item transaction, during which a condition is set up which causes said yoke 209 to be restored from its operated condition back to its normal position, as shown here and as will be described later in connection with the description of the customer special counter 70 (FIG. 2) in the lower row of special counters 62.

Movement of the total control lever 58 (FIG. 18) out of Reset Row 1 or Reset Row 2 position restores the crank 220 counter-clockwise, causing the stud 219, in co-operation with the tooth 218, to in turn restore the selecting lever 214 and the arm 211 counter-clockwise to normal position, to move the tooth 212 of said arm 211 out of coacting relationship with the counterbore 213 to prevent operation of the reset counter 64 when said total control lever 58 is in any position except Reset Row 1 or Reset Row 2 position.

*Transaction or Clerks' Special Counters*

The clerks' special counters 67, mounted in the lower row of special counters 62 (FIG. 2), are similar in construction, selection, and operation to the special counters of the upper row 61, with the exception that the clerks' special counters are arranged for Item count only and may not be arranged for Net count, as is possible with the counters in the upper row 61. Inasmuch as the six clerks' special counters are similar in construction and operation, it is believed that an explanation of one of these counters will be sufficient, and the special counter 67 corresponding to the K clerk's key 51 (FIG. 1), shown in detail in FIG. 22, will be described as representative of all of the clerks' transaction special counters.

Referring to FIGS. 2 and 22, each clerk's special counter 67 comprises three order wheels, each carrying a ratchet 231 and a corresponding retaining pawl 232 free on a rod 233 mounted in the special counter framework, said pawls being spring-urged into engagement with the teeth of said ratchets to retain them and their corresponding counter wheels in set positions. The teeth of the ratchets cooperate with corresponding teeth formed on a feed pawl 234 rotatably mounted between the arms of a yoke 235 free on the shaft 462, said pawl being spring-urged counter-clockwise to cause its teeth to yieldingly engage the teeth of the ratchets 231. The yoke 235 carries a stud 236, which cooperates with two notches in a retaining pawl 237 free on the rod 233, said retaining pawl 237 coacting with said stud 236 in exactly the same manner as explained for the similar pawl 104 (FIG. 14) for the department counter, to retain said yoke in either its operated position or its unoperated position. The yoke 235 (FIG. 22) carries a stud 238, which coacts with projections 239 and 240, formed on the lower end of a transaction counter operating arm 241 rotatably mounted on the shaft 178 adjacent to a companion selecting lever 242, also rotatably supported on said shaft 178. The lever 242 is flexibly connected to the arm 241 by a spring 243, tensioned between a stud in said lever and a stud 244 in said arm 241, to normally maintain a raised surface, formed on said lever 242, in yielding engagement with said stud 244, as shown here.

A spring 245 urges the lever 242 clockwise to normally maintain the upper end of a slot therein in yielding engagement with a rod 246, which is suspended from the rod 115 by three similar links 247 (FIG. 14), whereupon said rod 246 operates in unison with said rod 115 to permit a tooth 248, formed on the lower edge of said selecting lever 242, to sense for a counterbore 249 in a lower selecting shaft 250 journaled in the special counter framework, said counterbore corresponding to the K clerk's key 51 (FIG. 1). The shaft 250 is similar in construction and operation to the upper shaft 133 (FIG. 8) and is operatively connected to the differential mechanism for the Row 1 control keys, for positioning thereby, in exactly the same manner as explained in connection with the differential mechanism for the Row 2 control keys. The shaft 250 has secured near its right end a pinion 251 (FIGS. 6 and 16), which meshes with a segment 252 free on the shaft 122, and fixedly connected by a hub to a companion crank 253, having pivotally connected thereto the downward end of a link 254, the upper end of which link is pivotally connected to a secondary differential member 255 (FIG. 15) for the Row 1 control keys.

The secondary differential member 255 for the Row 1 control keys is positioned under control of said keys in exactly the same manner as explained for the Row 2 differential mechanism, shown in FIG. 19. Depression of the K clerk's key 51 causes the secondary member 255 and the shaft 250 (FIG. 22) to be positioned so that the counterbore 249 is opposite the tooth 248. This permits clockwise movement of the lever 242 and the arm 241 under influence of the spring 245 upon downward movement of the rod 246 (see FIG. 20 and space C, FIG. 23). Counter-clockwise movement of the operating arm 241 permits a tooth 256 thereof to be engaged by the corresponding counterbore 135, in the shaft 136, upon initial movement counter-clockwise of said shaft (see FIG. 9 and space A, FIG. 23). This rocks the operating arm 241 clockwise, against the tension of the spring 243, to cause the projection 240 to engage the stud 238 and rock the yoke 235 and the pawl 234 counter-clockwise to advance the units order wheel of the clerk's special counter 67 the equivalent of one digit in a counter-clockwise direction, to count the operation of the K clerk's key 51. Return movement clockwise of the special counter operating shaft 136 (FIG. 22) restores the operating arm 241 counter-clockwise, causing the projection 239 to engage the stud 238 and restore the yoke 235 from its operated position to its normal, or unoperated, position, as shown here.

From the foregoing description it should be apparent that the clerk's special counters 67 are of item construction and operate each time one of the clerks' keys 51 (FIG. 1) is used in a machine operation. Return movement upwardly of the rod 246 near the end of machine operation restores the lever 242 and the arm 241 counter-clockwise to unoperated position, as shown here.

The taxable item special counter 68 in the lower special counter row 62 (FIG. 2) is similar in every respect to, and operates exactly like, the clerks' special counter 67, explained above, and, therefore, no further description of this special counter is believed necessary.

Customer Special Counter

The customer special counter 70, in the lower special counter row 62 (FIG. 2), has four denominational order wheels, to provide the necessary capacity for properly counting customers over an extended period of time. The customer counter 70 counts "one" each time one of the clerks' keys 51, A to K inclusive (FIG. 1), is used to initiate the final item total operation of a multiple-item transaction. The clerks' keys 51 function normally as Item Total keys, but under certain circumstances said keys also function as No Sale keys, as will be explained fully later.

Directing attention to FIGS. 10 and 14, each of the four customer counter wheels 70 carries a ratchet 258, having coacting therewith a spring-urged retaining pawl 269 for retaining said ratchets and the corresponding counter wheels in set position. Also coacting with the teeth of the ratchets 258 is a feed pawl 259, mounted between the parallel arms of a yoke 260, free on the shaft 462 and carrying a stud 270, which cooperates with two notches formed in the inner edge of a yoke-retaining pawl 271, said pawl being spring-urged to retain the yoke in either its operated position or its unoperated position. The yoke 260 carries a stud 257 (FIG. 14), which cooperates with projections 261 and 262 formed on a downward extension of a customer counter operating arm 263 free on the shaft 178. Associated with the operating arm 263 is a companion selecting lever 264, also free on the shaft 178, said lever 264 having a raised surface normally maintained in yielding engagement with a stud 265 in said arm 263 by a spring tensioned between said stud and a stud in said lever 264. The lever 264 has a downwardly-disposed tooth 266, arranged to coact with a slot 267 (FIGS. 11 and 14) formed in the shaft 250, said slot corresponding to the positioning of said shaft under control of any of the clerks' keys 51, A to K inclusive. The selecting lever 264 has a slot 268, through which the rod 246 extends, and a spring 272 urges said lever 264 and its companion arm 263 clockwise to normally maintain the upper end of said slot 268 in yielding engagement with said rod 246.

Depression of any one of the clerks' keys 51 causes the shaft 250 (FIGS. 11 and 14) to be positioned under control of the differential mechanism for said keys (FIGS. 15 and 16), so that the slot 267 is in coacting relationship with the tooth 266, whereupon initial movement downwardly of the rod 246 permits clockwise movement of the lever 264 and its companion arm 263, under influence of the spring 272. Upon initial movement counter-clockwise of the operating shaft 136 (FIGS. 10 and 14), a tooth formed on a forward extension of the arm 263 engages the corresponding counterbore 135 in said shaft, and said arm is operated clockwise by said shaft to cause the projection 262 to engage the stud 257 and rock the yoke 260 and the feed pawl 259 counter-clockwise, whereupon said pawl, coacting with the teeth of the ratchet 258, advances the units wheel for the customer counter the equivalent of one digit, or one counter-clockwise step. Tens digits are transferred from lower to higher denominational orders of the customer counter wheels 70 through the medium of the graduated teeth of the pawl 259, in cooperation with deep notches in the ratchets 258 located between the "nine" position and the "zero" position of said wheels, as explained before. Return movement clockwise of the shaft 136 restores the arm 263 counter-clockwise, causing the projection 261 to engage the stud 257 and return the ratchet 258 from its operated position to its normal, or unoperated, position, where said yoke is yieldingly retained by the corresponding notch in the retaining pawl 271, in cooperation with the stud 270. Return movement upwardly of the rod 246 (FIGS. 11 and 14) restores the selecting lever 264 and its companion operating arm 263 counterclockwise to normal position, as shown here.

Initial movement clockwise of the arm 263 (FIGS. 10, 14, and 21), to operate the customer counter in item total operations, causes a stud 275, carried by said arm, in cooperation with an arcuate slot 276 in the segment 197, to restore said segment clockwise from its operated position, as shown in FIG. 21, to its unoperated position, as shown in FIG. 10, said segment in turn, through the link 198, restoring the arm 199 and the crank 200 to their normal, or unoperated, position. It will be recalled that the cam 202 operates the crank 200, the arm 199, and the segment 197 in the first machine operation following the final item total operation of a multiple-item transaction, to reset the wheels of the item counter 66 to zero position prior to operation of any department counter 63 or item counter 66 in the upper row of special counters.

It should be understood that the secondary members 143 and 255 (FIGS. 15, 16, and 19) for the Row 2 and Row 1 control keys, and the selecting shafts 133 and 250, positioned thereby, remain in set position at the end of machine operation and are moved directly from their preset positions to their new positions in the succeeding machine operation. In cases where no control key is pressed in the corresponding row, the secondary differential member therefor and the corresponding selecting shaft are restored to their zero positions in the succeeding machine operation.

*No-Sale Special Counter*

The clerks' keys 51 (FIG. 1), in addition to operating as Item Total keys in the final item total operation of a multiple-item transaction, also operate as No-Sale keys when used in operations following an item total operation and prior to an item entering operation, under control of the department keys 55 of Row 2. The manner in which the clerks' keys 51 select the no-sale special counter 69 for operation will now be explained.

The no-sale special counter 69 (FIGS. 2 and 17) comprises three order wheels, each of which carries a ratchet 277, the teeth of which coact with the teeth of a no-sale feed pawl 278 rotatably mounted between the parallel arms of a yoke 279 free on the shaft 462. The teeth of the pawl 278 are spring-urged into yielding engagement with the teeth of the ratchets 277. The yoke 279 carries a stud 280, which coacts with projections 281 and 282 formed on a downward extension of a no-sale operating arm 283 free on the shaft 178, said arm carrying a stud which is maintained in yielding engagement with a raised surface formed on a companion selecting lever 284 by a spring tensioned between said arm 283 and said lever 284 to form a yieldable connection between said parts. A rearward extension of the lever 284 has a slot which is engaged by the rod 246, and a spring 287 urges said lever 284 clockwise to normally maintain the upper end of said slot in yielding engagement with said rod 246.

Initial movement downwardly of the rod 246 (FIG. 17), as explained before, permits a tooth 285, formed on the lower edge of the lever 284, under influence of the spring 287, to sense for a slot 286, formed in the selecting shaft 250 and corresponding to the A to K clerks' keys 51. Entrance of the tooth 285 into the slot 286 rocks the lever 284 and the arm 283 clockwise to permit a forwardly-projecting tooth 288, formed on said arm 283, to be engaged by a corresponding counterbore 135 in the operating shaft 136, upon initial movement counter-clockwise of said shaft. This rocks the arm 283 clockwise, causing the projection 282 to engage the stud 280 and rock the yoke 279 and the feed pawl 278 counter-clockwise to advance the units order wheel of the no-sale counter one digit during a no-sale operation. Return movement clockwise of the operating shaft 136 (FIG. 17), near the end of machine operation, restores the arm 283 counter-clockwise, causing the projection 281 to engage the stud 280 and restore the yoke 279 and the feed pawl 278 clockwise, from operated position to normal, or unoperated, position.

It should be recalled, by referring to FIG. 9, that the cams 164 and 165 drive the operating shaft 136 initially counter-clockwise, after the differential mechanisms for the Row 1 and Row 2 control keys (FIGS. 15 and 16) have positioned the corresponding selecting shafts 250 and 133, and said cams 164 and 165 restore said operating shaft 136 clockwise from operated position back to normal, or home, position just at the end of machine operation (see space A, FIG. 23).

As explained previously, the customer counter 70 (FIGS. 2 and 14) is effective to count "one" in the final item total operation of each multiple-item transaction, under control of the A to K clerks' keys 51 in Row 1, and the use of these control keys in operations after an item total operation and prior to an item-entering operation causes "one" to be added in the no-sale special counter 69 for each no-sale operation performed under control of said keys 51. The mechanism for controlling the operation of the customer and no-sale special counters will now be described.

The selecting lever 264 for the customer counter 70 (FIGS. 10, 11, and 14) has a slot 290, which is engaged by a stud 291 in an arm 292 secured on a shaft 293 journaled in the special counter frames 74, 76, and 77 (FIG. 6). The selecting lever 284 for the no-sale special counter 69 (FIGS. 11 and 17) has a slot 294 engaged by a rod 295 extending between two similar arms 296 and 297 secured on the shaft 293 (see also FIG. 6). The arms 296 and 297 (FIGS. 6 and 17) are similar, in outline and in location on the shaft 293, to the arm 292 (FIGS. 11 and 14), and the rod 295, carried by said arms 296 and 297, is in axial alinement with the stud 291 carried by said arm 292. Also secured on the shaft 293 (FIG. 12) is a lever 298, slotted at its upper end to engage a stud 299 in a bell crank 300 secured on the shaft 109. An inward extension of the bell crank 300 carries a stud 301 pivotally supporting a by-pass pawl 302 urged counter-clockwise by a spring 303 to normally maintain an outward extension of said pawl in yielding engagement with the stud 299. The by-pass pawl 302 has a depending tooth 304 arranged to coact with a roller 305 carried by the arm 199 (see also FIGS. 10 and 21). A downward extension of the lever 298 (FIG. 12) has two retaining notches, which are arranged to be engaged by a roller 306 carried by an arm 307 free on a stud 308 secured in the special counter framework, and said arm 307 is urged clockwise by a spring 309 to normally maintain said roller 306 in yielding engagement with either of said notches in said lever 298. The two notches in the lever 298 correspond, respectively, to the operated and restored positions of said lever, the shaft 293, and the other parts secured on said shaft, and the roller 306 on the arm 307, coacting with these two notches, yieldingly retains said parts in either of their two positions.

As previously explained, all transactions performed by the machine embodying the present invention are what are termed "multiple-item transactions" in this art and comprise one or more item-entering operations and a final item total operation, the former being initiated under control of the Row 2 Department keys and the latter under control of the Row 1 Clerks' key 51 (FIG. 1). It will also be recalled that, in item total operations, initial movement clockwise of the customer counter operating arm 263 (FIG. 10) causes the stud 275, in cooperation with the slot 276 in the segment 197, to restore said segment clockwise and the arm 199 and the crank 200 counter-clockwise from operated position, as shown in FIG. 21, to normal, or unoperated, position, as shown in FIG. 10. During this counter-clockwise restoring movement of the arm 199 (FIG. 12), the roller 305 thereon by-passes the tooth 304 of the pawl 302 without imparting any movement to said pawl, the bell crank 300, and the lever 298.

After the final item total operation of a multiple-item transaction, a no-sale operation may be initiated by depression of any one of the A to K Clerks' keys 51, and, during operation of the machine, clockwise movement of the cam shaft 130 and the cam 202 (FIGS. 10 and 21 and space B, FIG. 23) rocks the crank 200 and the arm 199 clockwise. This causes the roller 305 to engage the tooth 304 of the pawl 302 and rock said pawl, the bell crank 300, and the shaft 109 counter-clockwise (FIG. 12), and said bell crank simultaneously rocks the lever 298, the shaft 293, the stud 291, and the rod 295 clockwise, from the position shown in FIG. 12 to the position shown in FIG. 11. The stud 291, coacting with the locking portion of the slot 290 in the customer counter selecting lever 264, obstructs clockwise sensing movement of said lever and thereby prevents operation of the customer special counter 70 in no-sale operations. Simultaneously, clockwise movement of the rod 295 (FIG. 17) moves said rod out of the locking portion of the slot 294 in the no-sale selecting lever 284 and into a clearance portion of said slot, to free said selecting lever for clockwise sensing movement, under control of the rod 246, so that the no-sale special counter 69 will be operated in no-sale operations.

The retaining arm 307 (FIG. 12) holds the lever 298, the shaft 293, the stud 291, and the rod 295 in their clockwise, or operated, position until an item-entering operation is initiated by one of the Department keys 55, in the manner explained earlier herein. It is, therefore, evident that, in the interval between a final item total operation of a multiple-item transaction and the first item-entering operation of a succeeding transaction, the Clerks' keys 51 may be used as many times as desired for initiating no-sale operations, and such no-sale operations will be counted on the no-sale counter 69, in the manner explained above.

Counter-clockwise movement of the bell crank 300 and the shaft 109, upon clockwise operation of the crank 200 and the arm 199 by the cam 202 (FIG. 21), causes fingers 311 (FIGS. 8 and 12) secured on said shaft 109, in cooperation with corresponding studs 312 secured in the arms 169, to rock said arms counter-clockwise, causing their upward extensions to engage the studs 106 and restore all department yokes 96, operated in the previous item-entering operations, clockwise to unoperated position, in preparation for the next item-entering operation. The above-explained restoration of the department counter yokes 96 occurs in the first no-sale operation following an item total operation, and also in the first item-entering operation following an item total operation. In either case, the functioning of the parts is exactly the same, and said restoration occurs at the beginning of machine operation, in ample time for said restored yokes to be selected for operation in the same operation in which they were restored from operated position to unoperated position.

In the first item-entering operation following an item total operation, operation of the yoke 96 corresponding to the depressed Department key 55 (FIGS. 1, 8, and 14) by the arm 108 and the shaft 136, as explained earlier, causes the stud 106 to engage the arm 169 and rock it The lever 332 (FIGS. 4 and 5) carries a stud 348, which cooperates with an inner surface of an arm 349 clockwise, which, through the stud 312, rocks the corresponding finger 311, shaft 109, and bell crank 300 (FIG. 12) also clockwise, said bell crank in turn restoring the lever 298, the shaft 293, the arms 292, 296, and 297, the stud 291, and the rod 295 counter-clockwise from operated position to restored position, as shown here. Counter-clockwise movement of the stud 291, from the position shown in FIG. 11 to the position shown in FIG. 14, moves said stud out of the locking portion of the slot 290 in the customer counter selecting lever 264 and into a clearance portion of said slot, where clockwise selecting movement of said lever 264 is not restricted. Counter-clockwise movement of the rod 295 moves said rod out of the clearance portion of the slot 294 in the no-sale selecting lever 284 (FIG. 17) and into the locking portion of said slot, to retain said lever 284 against clockwise sensing movement and thereby disable operation of the no-sale special counter 69, while at the same time the customer special counter 70 is rendered operative under control of the depressed Clerk's key 51 (FIG. 1) in the final item total operation of a multiple-item transaction.

The above-described construction of the no-sale and customer special counters 69 and 70 and their controlling mechanisms permits the selective operation of either of said counters under control of the Clerks' keys 51, thereby making it unnecessary to provide a special No-Sale key and all of the mechanism required in connection therewith, for controlling the machine and for selecting the no-sale special counter 69 for actuation in no-sale operations.

The above-described restoration of the yokes 96, under control of the fingers 311, applies only to the Net type of special counters in the upper row 61, as the item type of special counters in said row are restored by the studs 167 (FIG. 8) in cooperation with the projections 168 of the arms 169, upon counter-clockwise return movement of the corresponding operating arms 108. Operation of the Item type of special counter, in the upper row, causes the stud 106 in the yoke 96 therefor, in cooperation with the corresponding arm 169, stud 312, and finger 311 on the shaft 109, to restore said shaft 109 and the parts connected thereto, including the lever 298, the stud 291, and the rod 295 (FIGS. 14 and 17), to normal, or unoperated, position.

*Automatic Reset Mechanism for Special Counters*

Mechanism rendered operative upon depression of the Special Counter Reset key 71 (FIGS. 1 and 3) is provided for resetting all of the special counters to zero, with the exception of the reset counter 64 (FIG. 2), which is never reset, and the Item special counter 66.

The Special Counter Reset key 71 (FIG. 3) is mounted for horizontal sliding movement by means of two parallel slots therein, in cooperation with studs 315 and 317 secured in the left frame 85 (see also FIG. 6). A spring 316, tensioned between the key 71 and the frame 85, urges said key outwardly to normally maintain it in undepressed position, as shown here. The key 71 carries a stud 318, which coacts with a curved cam slot 319 in an arm 320 pivoted on a stud 321 secured in the frame 85. A slot in the forward end of the arm 320 freely engages a stud 322 in the upper end of a slide 323, mounted for vertical sliding movement by means of two slots therein, in cooperation with studs 324 and 325 secured in the frame 85. A spring 326 urges the slide 323 upwardly to maintain said slide and connected parts normally in the position shown here. The downward end of the slide 323 carries a stud 327 embraced by a slot in a forward extension of a release arm 328 free on a stud 329 secured in the frame 85. A forward extension 330 (FIGS. 3 and 4) of the arm 328 coacts with a square stud 331 in the lower end of a lever 332 journaled on the stud 324. A spring 334 (FIG. 4) urges the lever 332 counter-clockwise to normally maintain the square stud 331 in yielding engagement with the outer end of the extension 330 of the arm 328. Integral with the lever 332 is a clutch-disengaging arm 335, the inward end of which cooperates with a shoulder formed on a clutch pawl 336 free on a stud 337 carried by a plate cam 338 assembled in fixed relationship to a clutch-disengaging cam 339 and a gear 340 free on a stud 341 secured in the left frame 85 (FIG. 6). A spring 342 (FIG. 4) urges the clutch pawl 336 counter-clockwise to normally maintain the shoulder thereon in yielding engagement with the inner end of the arm 335 and, upon disengagement of said arm, to engage a tooth, formed on said pawl 336, with one of a series of teeth formed on the periphery of a drive ratchet 343 integral with a large gear 344 free on the stud 341. The gear 344 meshes with a drive gear 345 secured on a shaft 346 journaled in the motor framework (not shown) and connected by a reduction gearing to the armature shaft of the operating motor (not shown, but fully disclosed in FIG. 16 of the Werner et al. United States Patent No. 2,880,930). The clutch mechanism disclosed herein is similar in many respects to the clutch mechanism disclosed in said patent for connecting the operating motor to the main cam shaft of the machine.

The lever 332 (FIGS. 4 and 5) carries a stud 348, which cooperates with an inner surface of an arm 349 free on a stud 324. The arm 349 has an upward extension carrying a stud 350, which coacts with the downward surface of an ear 351 formed outwardly from a bracket 352 secured to a switch-operating plate 353 free on a key lock and machine release shaft 354 journaled in the machine framework. The shaft 354 is similar in every respect to the key lock and machine release shaft 147 disclosed in FIG. 16 of the Werner et al. United States Patent No. 2,880,930. A spring 355, tensioned between a stud in the plate 353 and a stud 356 in an arm 357 secured on the shaft 354, urges said plate 353 counter-clockwise to normally maintain a shoulder formed on its lower edge in yielding engagement with said stud 356. The plate 353 has formed therein a cam slot 358, through which extends a stud 359 in a switch-operating lever 360, which is similar in appearance and function to the lever 176 disclosed in FIG. 16 of the Werner et al. United States Patent No. 2,880,930.

Inward depression of the Special Counter Reset key 71 (FIGS. 3, 4, and 5), against the action of the spring 316, rocks the arm 320 counter-clockwise, said arm in turn shifting the slide 323 downwardly, against the action of the spring 326, to rock the release arm 328 counter-clockwise. Counter-clockwise movement of the arm 328 disengages its extension 330 from the square stud 331, to free the lever 332 to the action of the spring 334, which immediately rocks said lever and the integral arm 335 counter-clockwise, to disengage the inner end of said arm from the shoulder formed on the pawl 336. This frees the clutch pawl 336 to the action of the spring 342, which immediately engages the tooth of said pawl with one of the teeth in the ratchet 343, to establish an operating connection between said pawl 336, the cams 338 and 339 and the gear 340, the ratchet 343, the gear 344, the gear 345, the shaft 346, and the operating motor. Counter-clockwise movement of the lever 332, when said lever is released, causes the stud 348 to rock the arm 349 (FIG. 5) counter-clockwise, whereupon the stud 350, coacting with the ear 351, rocks the switch-operating plate 353 clockwise, independently of the arm 357 and the shaft 354, which remain in the unoperated position, shown here, until operated to initiate an operation of the machine, in the well-known manner.

Clockwise movement of the plate 353 rocks, through the cam slot 358 and the stud 359, the switch-operating lever 360 counter-clockwise to close the switch (not shown) for the operating motor (not shown), which, upon being energized, drives the shaft 346 and the gear 345 (FIG. 4) clockwise, and the gear 344 and the ratchet 343 counter-clockwise, whereupon the teeth of said ratchet engage the tooth of the pawl 336 and rotate said pawl, the cams 338 and 339, and the gear 340 counter-clockwise in unison with said gear 344. The operating motor then drives the cams 338 and 339 and the gear 340 through one counter-clockwise revolution, near the end of which a lobe 362, formed on said cam 339, engages an inwardly-disposed projection 363 on the lever 332 and restores said lever clockwise, against the action of the spring 334, to move the arm 335 into the path of the shoulder on the pawl 336 to disengage said pawl from the ratchet 343, to terminate revolution of said pawl and the parts connected thereto. Clockwise restoring movement of the lever 332 also moves the square stud 331 beyond the end of the extension 330 to free the arm 328 and the slide 323 for restoring movement clockwise and upwardly, respectively, under influence of the spring 326, to move said extension 330 into the path of said stud 331, to retain said lever 332 in restored position.

Means is provided to prevent unintentional repeat cycles of the special counter resetting mechanism, in case the key 71 (FIG. 3) is retained depressed at the end of a resetting cycle.

Adjacent the arm 328 (FIG. 3) is a non-repeat pawl 364 free on the stud 329 and urged clockwise by a spring 361 into yielding engagement with a stud 365 carried by said arm 328. When the parts are in normal, or home, position, as shown in FIG. 3, the stud 365 retains the non-repeat pawl 364 a slight distance above the square stud 331, and said non-repeat pawl, being slightly longer than the extension 330, consequently overlies the upper surface of said stud 331. When the arm 328 and the extension 330 are rocked clockwise, by depression of the key 71, the spring 361 carries the non-repeat pawl 364 in unison therewith, until the outer end of said pawl contacts the upper surface of the stud 331, whereupon the arm 328 and the extension 330 move independently of said pawl, until said extension 330 is beneath said stud 331. If the key 71 were retained depressed at the end of the resetting cycle, the extension 330 would be held beneath the stud 331, and, as a result, the lever 332, after being restored, would be free to operate again under influence of the spring 334, to initiate a repeat operating cycle of said resetting mechanism, were it not for the non-repeat pawl 364.

When the arm 328 and the extension 330 (FIGS. 3 and 4) are retained in their counter-clockwise position by the depressed key 71, restoring movement clockwise of the lever 332, by the cam 339, moves the stud 331 slightly beyond the end of the non-repeat pawl 364, whereupon the spring 361 immediately moves said pawl into the path of said stud 331 to obstruct counter-clockwise releasing movement of said lever 332 and thereby prevent an unintentional repeat cycle of the resetting mechanism. Removal of pressure from the key 71 permits the springs 316 and 326 to restore the slide 323 upwardly and the arm 328 and the extension 330 clockwise, whereupon the stud 365 disengages the non-repeat pawl 364 from the stud 331 and simultaneously moves said extension 330 into the path of said stud 331, to retain said lever 332 in its restored position.

If for any reason the springs 316 and 326 fail to restore the arm 328 and the pawl 364 clockwise, the usual key release lever 60 (FIG. 4) may be used to accomplish this result. The key release lever 60 is rotatably supported on a stud 367 (FIG. 4) secured in the left frame 85 (FIG. 6), and a downward extension of said lever carries a stud 368, which pivotally supports the upper end of a link 369 pivotally connected at its lower end to an arm 370 free on a stud 366 secured in the frame 85. Integral with the arm 370, and operating in unison therewith, is a crank 371, carrying a stud 372, which coacts with projections 373 and 374 formed on an arm 375 free on a stud 376 secured in the frame 85.

The upper end of the key release lever 60 (FIG. 4) forms a fingerpiece which extends through a clearance slot in the machine case and provides convenient means for operating said lever counter-clockwise, against the action of a spring 377, which urges said lever clockwise to normally retain it in yielding engagement with a rubber bumper 378 secured to the upper edge of the total control lever 58. Counter-clockwise movement of the lever 60 rocks, through the link 369, the arm 370 and the crank 371 clockwise, causing the stud 372, in cooperation with the projection 373, to rock the arm 375 counter-clockwise. Counter-clockwise movement of the arm 375 causes a half-round stud 379, carried thereby, to engage a forward surface 380, formed on the upper end of the lever 332, and rock said lever clockwise, against the action of the spring 334, to disengage the stud 331 from the end of the non-repeat pawl 364 (FIG. 3) to permit said repeat pawl, the arm 328, and connected mechanism to be spring-restored upwardly, or clockwise, to normal position, in which the extension 330 moves into the path of said stud 331 to block releasing movement counter-clockwise of said lever 332. Return movement clockwise of the key release lever 60, by the spring 377, causes the stud 372 to engage the projection 374 and restore the arm 375 clockwise to normal position, in which the stud 379 is above the surface 380. Counter-clockwise operating movement of the lever 332 moves an arcuate surface, formed on its upper end, beneath the stud 379 to prevent operation of the arm 375 and said stud by the key release lever 60 during operation of the special counter resetting mechanism.

Counter-clockwise operation of the arm 349 (FIG. 5) by releasing movement of the lever 332 moves an arcuate surface 381, formed on an inward extension of said arm, into the path of a stud 382 carried by a downward extension of an arm 383 secured on the key lock and machine release shaft 354 (FIG. 4) to obstruct clockwise releasing movement of said shaft while the special counter resetting mechanism is functioning. Clockwise releasing movement of the shaft 354 and the arm 383 moves the stud 382 into the path of an arcuate surface 384, formed on the arm 349, to obstruct counter-clockwise movement of said arm during operation of the machine.

Engagement of the arm 335 (FIG. 4) with the shoulder on the pawl 336 not only disengages said pawl from the teeth of the ratchet 343, but obstructs further movement of said pawl, the cams 338 and 339, and the gear 340, and positively locates said parts in home position, where an undercut portion of the periphery of said cam 338 is opposite the stud 382 in the arm 383, to provide clearance for said stud so that the arm 383 and the release shaft 354 are free to operate clockwise to initiate operation of the machine, in the usual and well-known manner. Counter-clockwise movement of the cam 338, away from normal, or home, position (FIG. 4) moves a high portion of the periphery of said cam into the path of the stud 382 to obstruct clockwise movement of the arm 383 and the shaft 354 to prevent release of the machine for operation, during the time that the special counter resetting mechanism is functioning. Clockwise restoring movement of the lever 332 (FIGS. 4 and 5) by the cam 339 also restores the arm 349 in unison therewith, thus permitting the spring 355 to restore the plate 353 counter-clockwise from operated position to normal position to restore the switch-operating lever 360 clockwise to open the switch to the electric motor and thus terminate operation of said motor, after the resetting cycle has been completed.

A stud 385 (FIG. 4), carried by the key release lever 60, coacts with an upward extension 386 of the link 369 to limit counter-clockwise operation of said lever 60.

The gear 340 (FIG. 4) is connected by a train of gearing, shown in FIGS. 6 and 7, to the upper special counter shaft 461 and the lower special counter shaft 462, so that revolution of said gear 340, through this train of gearing, turns said shafts 461 and 462 one counter-clockwise revolution, causing a shoulder, formed on each of said shafts, to engage reset pawls carried by each of the special counter wheels, to engage said pawls, which are spring-urged into their engaging relationship with said edge and rotate said wheels from their present position to zero position to reset all of the special counters, with the exception of the wheels of reset counter and the item counter, which wheels are not provided with reset pawls and are therefore not reset by the special counter resetting mechanism.

Directing attention to FIGS. 4, 6, and 7, the gear 340 is connected by an idler gear 388, free on a stud 389, secured in the left plate 80, to a gear 390, secured in fixed relationship to a companion gear 392 by a short shaft 391, journaled in the special counter framework. The gear 392 is connected by an idler gear 393, free on a stud 394, secured in the frame 80, to a gear 395, secured to the upper special counter shaft 461. The gear 393 (FIG. 7) is connected by a companion idler gear 396, free on a stud 397, secured in the frame 80, to a gear 398, which together with a companion gear 399, is secured on a short shaft 400, journaled in the special counter framework. The gear 399 meshes with a gear 401, secured on the special counter shaft 462.

The gears 340 (FIG. 7), 390, 392, 395, 398, 399, and 401 are exactly alike in number of teeth and diameter, and, as a result, the gear 340, which makes one counter-clockwise revolution each operation of the special counter resetting mechanism (FIG. 4), drives said gears 395 and 401 and the shafts 461 and 462 also one counter-clockwise revolution for each operation of the resetting mechanism. The shafts 461 and 462 (FIG. 7) have, respectively, resetting shoulders or edges 402 and 403 extending their full length, which cooperate, respectively, with pawls 404 and 405 carried by all of the special counter wheels with the exception of the wheels 64 (FIG. 2) of the reset special counter and the wheels 66 of the item counter, as it is desirable that the wheels 64 of the reset counter never be reset, and as the wheels 66 of the item counter are reset automatically under control of the mechanism shown in FIG. 10 and explained earlier herein, in each item total operation. The pawls 404 and 405 are spring-urged into coacting relationship with the corresponding shoulders 402 and 403; consequently, counter-clockwise rotation of the shafts 461 and 462 causes said shoulders to engage said pawls and rotate the corresponding wheels in unison therewith to zero position to reset said wheels upon depression of the special counter Reset key 71 (FIGS. 1 and 6).

Depression of the special counter Reset key 71 (FIG. 3) is controlled by the total control lever 58, and said key is blocked against depression at all times except when said total control lever 58 is in either Reset Row 1 position or Reset Row 2 position.

A blocking arm 406 (FIGS. 3 and 18) is secured in fixed relationship to the arm 222 by a hub extending between said arms, and a blocking surface 407, formed on the forward end of said arm 406, is normally in the path of the lower end of the stem of the special counter Reset key 71, as shown in FIG. 3, at all times except when the total control lever 58 is moved to either Reset Row 1 position or Reset Row 2 position. Movement of the total control lever 58 to either Reset Row 1 position or Reset Row 2 position (FIG. 18) rocks the bell crank 225 clockwise and the arm 222 and its companion arm 406 counter-clockwise to move the blocking surface 407 beneath and out of the path of the stem of the special counter Reset key 71, so that said key may be depressed to initiate a special counter resetting operation when the total control lever is in either Reset Row 1 position or Reset Row 2 position. Depression of the Reset key 71 (FIG. 3) moves the lower end of its stem above a surface 408, formed on the upper edge of the arm 406, to block clockwise movement of said arm and thus, through the arm 222 (FIG. 18) and the bell crank 225, to lock the total control lever 58 in either Reset Row 1 position or Reset Row 2 position, while the special counter reset mechanism is operating.

The usual interlock between the total control lever 58 and the amount keys 50 is provided for preventing movement of said total control lever out of Register position when an amount key is depressed, and for preventing depression of an amount key when the total control lever is moved out of Register position. This mechanism comprises a cam slot 409, in the total control lever 58 (FIG. 18), which coacts with a stud 410 in the upper end of a lever 411 pivoted on a stud 412 secured in the left frame 85 (FIG. 6). A downward extension of the lever 411 (FIG. 14) coacts with a stud 421 in an arm 413 connected in fixed relationship to a companion arm 416 by rods 414 and 415, said arms 413 and 416 being pivotally supported on the release shaft 354. Movement of the total control lever 58 (FIGS. 14 and 18) in either direction away from Register position causes the slot 409, in cooperation with the stud 410, to rock the lever 411 clockwise, said lever in turn rocking the arms 413 and 416 counter-clockwise to lock the amount keys against depression, in the usual and well-known manner, when the total control lever 58 is moved away from Register position. Counter-clockwise movement of the arm 416, through a roller 417 carried thereby, in cooperation with a rearward extension 418 of the crank 116 (FIG. 14), obstructs counter-clockwise sensing movement of said crank and the rods 115 and 246 to prevent selection of a special counter for operation when the total control lever is moved out of Register position.

The above disabling of the special counters by the total control lever 58 does not apply to the reset counter 64, as the rod 115 does not coact with a slot in the selecting lever 214 for said reset counter and, consequently, has no effect on its operation.

Mode of Operation

While it is believed that a thorough understanding of the operation of the special counter mechanism will have been obtained from a perusal of the preceding description, nevertheless a brief description of the operation of the machine embodying the present invention and its relation to the operation of said special counter mechanism may prove helpful and will now be given.

All transactions performed on the machine embodying the present invention are what are termed "Multiple Item Transactions," comprising one or more item-entering operations and a final item total operation. Referring to FIG. 1, with the total control lever 58, often referred to as a "Unit Lock Lever," in Register position, the operator sets up the value of the first item on the amount keys 50 and depresses the proper Department key 55 to initiate an item-entering operation, during which the item is entered in the main itemizer and in the corresponding totalizer, printed upon the record material, and simultaneously set up on the indicators. Additional items involved in the same transaction are entered in the same manner, using the keys 55 for all non-taxable items and using the Taxable Item key 52 for taxable items, which causes these items to be entered in the auxiliary itemizer, which accumulates a temporary total of taxable items.

During the first item-entering operation, the special counter 63 (FIG. 2) corresponding to the depressed Department key 55 is actuated, in the manner explained before, to indicate operation of said Department key 55. However, the department special counters 63 (FIG. 2) are Net-type counters and only count "one" during each multiple-item transaction, and, if the same key 55 is used more than once in such a transaction, the corresponding counter will count "one" for the first time this key is used and will not count subsequent uses of said key. The Taxable Item key 52 (FIG. 1) causes "1" to be entered in the taxable item special counter 68 in the lower row 62 (FIG. 2) for each time this key is used in a multiple-item transaction. It will be recalled that all of the special counters in the lower row 62 are item counters, in that they count "one" for each time the corresponding key is used.

After all of the items have been entered, under control of the Department keys 55 and the Taxable Item key 52 (FIG. 1), the Taxable Total key 53 is used to indicate a taxable total operation, in which the auxiliary or tax itemizer is cleared and the total amount of the taxable items therein is transferred to the main itemizer, which also contains a total of the items entered under control of the Department keys 55. The Taxable Item key 52 also causes the total amount of the taxable items to be printed upon the record material and simultaneously displayed by the indicators, the latter being used by the operator to compute the amount of the tax on the taxable items. Afterward, the tax is set up on the amount keys 50, and the Tax key 56 is depressed to initiate a tax operation, during which the amount of the tax is entered in the main itemizer in a totalizer corresponding to the Tax key 56, printed on the record material, and simultaneously set up on the indicators. The Sub-Total key 54 (FIG. 1) may be used any time it is necessary or desired to read the amount contained in the main itemizer, said amount being simultaneously printed upon the record material and set up on the indicators.

After all of the non-taxable and taxable items and the tax on the taxable items have been entered in the machine, a final item total operation is initiated by depression of the proper one of the Clerks' keys 51, and during said operation the main itemizer is cleared and the amount therein is transferred to the group totalizer, printed on the record material, and simultaneously set up on the indicators. During the final item total operation, the Clerks' special counter 67 (FIG. 2) corresponding to the Clerk's key 51 counts "one" to keep a count of the number of times said key 51 is used to initiate an item total operation. Depression of one of the Clerks' keys 51, to initiate an item total operation, also selects the customer special counter 70 in the lower row for operation, to count "one" for each item total operation.

After an item total operation, no-sale operations may be initiated by depression of any one of the Clerks' keys 51 (FIG. 1), and in this case the no-sale special counter 69 in the lower row is selected for operation and counts "one" for each no-sale operation performed under control of said keys 51.

The item counter 66 in the upper row 61 counts "one" for each item entered under control of the Department keys 55. In the final item total operation of a multiple-item transaction, a condition is set up which causes the item counter 66 to be automatically reset to zero in the next operation of the machine, and simultaneously a condition is set up which causes all of the operated yokes for the net count special counters 63 to be returned from operated position to unoperated position in the operation following an item total operation. In case the next operation is the first item-entering operation in a multiple-item transaction, the yokes for the department counters 63 are returned to unoperated position prior to the time for said yokes to be operated under control of the depressed Department key 55 in said first item-entering operation.

With the exception of the reset special counter 61 (FIG. 2), the other special counters are disabled for selection when the total control lever 58 (FIG. 1) is moved out of Register position. Movement of the total control lever 58 out of Register position, through the mechanism disclosed in FIGS. 14 and 18, renders the special counter selecting mechanism inoperable, so that no special counter may be selected at this time. When the total control lever 58 is in Register position, as shown in FIG. 18, the selecting movement of the reset special counter selecting mechanism is rendered inoperative, so that said reset special counter will not operate at this time. Movement of the total control lever 58 to either Reset Row 1 position or Reset Row 2 position (FIGS. 1 and 18) renders the selecting mechanism for the reset special counter 64 operative, so that said reset counter counts "one" under such circumstances.

Like the department special counters 63 (FIG. 2), the reset special counter 64 is a Net-type special counter, in that it may be actuated only once between multiple-item transactions, and is returned from operated position to unoperated position similarly to the said counters 63 in the first operation following an item total operation.

With the total control lever 58 in Read Row 1 position or in Reset Row 1 position (FIG. 1), the Taxable Item key 52 or the Taxable Total key 53, in Row 1, may be used to initiate a reading operation or a resetting operation, during which the corresponding totalizer is read or reset. Likewise, movement of the total control lever 58 to Read Row 2 position or to Reset Row 2 position permits the keys 55, 56, and 57, in Row 2, to be used in conjunction therewith to either read or reset the corresponding totalizers.

At the end of a particular business period, such as a day, it may be desirable to reset the special counters, and this is accomplished by moving the total control lever 58 to either Reset Row 1 position or Reset Row 2 position, to move the obstructing member 406 (FIG. 3) out of the path of the lower end of the stem of the special counter Reset key 71, whereupon said key may be depressed to initiate a special counter resetting operation. During the ensuing operation, all of the special counters, with the exception of the reset special counter 64 and the item special counter 66, are reset to zero, in preparation for a subsequent business period. The reset special counter 64 is never reset, and the item special counter 66 is reset automatically by the mechanism shown in FIG. 10, through a condition which is set up in the final item total operation of a multiple-item transaction and performed in the immediately-succeeding operation.

It is obvious that the selection of the special counters under control of the Row 1 and Row 2 control keys (FIG. 1) may be varied in any manner desired by proper arrangement of the counterbores and the slots in the respective selecting shafts for said special counters, to suit the requirements of the business system to which the machine is being applied.

While the form of mechanism shown and described herein is admirably adapted to fulfill the objects primarily stated, it is to be understood that it is not intended to confine the invention to the one form or embodiment disclosed herein, for it is susceptible of embodiment in various other forms, all coming within the scope and spirit of the invention.

What is claimed is:

1. In a special counter mechanism for a machine of the class described, the combination of operable control elements to control operation of the machine; a counting device for each control element to record the operation of said control elements; an operating member for each counting device; an operating shaft having a depression for each operating member and selectively engageable therewith to operate the corresponding counting devices; a selecting means associated with each operating member to engage said operating members with the corresponding depressions in the operating shaft; a selecting shaft having a depression corresponding to each control element, said shaft being positionable by said control elements to locate the corresponding depressions in coacting relationship with the corresponding selecting means; and means, effective after the selecting shaft has been positioned, and prior to operation of the operating shaft, to cause the selecting means corresponding to the operated control element to sense the selecting shaft and engage the corresponding depression to in turn cause the corresponding operating member to be engaged by the corresponding depression in the operating shaft to operate the corresponding counting devices to record the operation of said control element.

2. In a special counter mechanism for a machine of the class described, the combination of an operable control element to initiate machine operation; a special increment counter to count the operation of the control element; an operating member for the counter; an operating shaft having a depression engageable with the operating member to operate the special counter; a selecting lever associated with the operating member and normally effective to hold said operating member out of engagement with the depression; a selecting shaft having a depression engageable by the selecting lever to render the operating member effective; means between the control element and the selecting shaft, and effective upon operation of said control element, to position the depression in said selecting shaft in coacting relationship with the selecting lever; and means, effective after the selecting shaft has been positioned, and prior to operation of the operating shaft, to cause the selecting lever to sense for and to engage the depression in the selecting shaft to free the operating member for engagement with the depression in the operating shaft to operate the counter to count the operation of the control element.

3. In a special counter mechanism for a machine of the class described, the combination of a plurality of operable control elements to control operation of the machine; a special increment counter for each control element to count the operation of said control elements; an operating member for each counter; an operating shaft having an operating depression for each operating member and engageable with the members to operate the corresponding counters; a selecting lever associated with each operating member and normally effective to hold the corresponding members out of engagement with the depressions in the operating shaft; a selecting shaft having a depression for each selecting lever and engageable thereby to render the corresponding operating members effective; means between the control elements and the selecting shaft and controlled by the operated control element to position said selecting shaft accordingly to aline the depression therein corresponding to said operated control element with the corresponding selecting lever; and means, effective after the selecting shaft has been positioned, and prior to operation of the operating shaft, to cause the selecting lever to sense for and to engage the depression in the selecting shaft to cause the associated operating member to engage the depression in the operating shaft to operate the corresponding special counter to count the operation of the operated control element.

4. In a machine of the class described, constructed and arranged to perform transactions comprising item-entering operations and a final item total operation, the combination of a first control element to initiate item-entering operations; a second control element to initiate item total operations; a first special increment counter to count the operation of the first control element; a second special increment counter to count the operation of the second control element; an operating shaft for the counters, said shaft having operating depressions corresponding to each of the control elements; an operating member for each counter engageable with the corresponding depressions in the operating shaft to operate the corresponding counters; a sensing means associated with each operating member; a selecting shaft for each sensing means and having depressions engageable by the corresponding sensing means; means controlled by each control element for positioning the corresponding selecting shaft to aline the depressions therein with the corresponding sensing means; means, effective after the selecting shafts have been positioned and prior to operation of the operating shaft, to cause the sensing means to sense for and to engage the depressions in the selecting shafts to cause the corresponding operating members to in turn engage the depressions in the operating shaft to advance the corresponding counters to count the operation of said control elements, said first counter constructed and arranged to remain in operated condition so as to count only the first operation of the first control element in each transaction; and means rendered effective by the operating member for the second special counter in an item total operation to cause the first special counter to be restored to unoperated condition, in the first operation following said item total operation.

5. In a machine of the class described, constructed and arranged to perform transactions comprising one or more item-entering operations and a final item total operation, and to also perform no sale operations, the combination of a control element to initiate item-entering operations; a control element to initiate item total operations and no sale operations; a special counter to count item total operations; a special counter to count no sale operations; an operating arm for the item total counter; an operating arm for the no sale counter; an operating shaft having depressions engageable by the operating arms to cause said arms to operate the corresponding counters; a selecting lever associated with each operating arm and normally effective to retain said operating arms out of engagement with the depressions; a selecting shaft having depressions corresponding to each of the selecting levers and positionable in coacting relationship with said levers when said shaft is positioned under control of the item total control element; means to cause the selecting levers to sense for and to engage the corresponding depression in the selecting shaft, to cause the associated operating arms to engage the corresponding depressions in the operating shaft to operate the corresponding counters; operable means coacting with the selecting levers to alternately enable one lever and to simultaneously disable the other lever, to alternately enable and disable the corresponding special counters; means rendered effective in an item total operation and operable in an immediately-following no sale operation initiated by use of the item total control element to operate the operable means in one direction to enable the no sale selecting lever and to simultaneously disable the item total selecting lever to count one for said no sale operation; and means rendered effective in the first item-entering operation of a transaction initiated by use of the item-entering control element to operate the operable means in the opposite direction to enable the item total selecting lever and to simultaneously disable the no sale selecting lever to permit operation of the item total special counter and to simultaneously prevent operation of the no sale counter to count one for the item total operation of said transaction.

6. In a machine of the class described, constructed and arranged to perform no sale operations and to perform transactions comprising one or more item-entering operations and a final item total operation, the combination of operable control elements to initiate item total operations and no sale operations; a special counter to count the item total operations; a special counter to count the no sale operations; an operating arm for each special counter; an operating shaft having a depression for each operating arm and engageable therewith to operate the corresponding special counters; a selecting lever associated with each operating arm and normally effective to retain the operating arms out of engagement with the depressions; a selecting shaft having depressions corresponding to each selecting lever; means controlled by the item total and no sale control elements to position the selecting shaft to aline the depressions therein with the selecting levers; means, operable after the selecting shaft has been positioned, and prior to operation of the operating shaft, to cause the selecting levers to sense for and to engage the depressions to move the operating arms into coacting relationship with the depressions in the operating shaft to operate the corresponding special counters; shiftable means to alternately free one selecting lever for sensing movement and to simultaneously hold the other selecting lever against such movement, said shiftable means normally effective to free the selecting lever for the item total special counter for sensing movement and to hold the selecting lever for the no sale special counter against such movement to cause the item total special counter to be operated to count the item total operations; and means rendered effective in an item total operation and operable in an immediately-succeeding no sale operation to shift the shiftable means to free the sensing lever for the no sale counter for sensing movement and to hold the other sensing lever against such movement to cause the no sale counter to be operated to count the no sale operations.

7. In a machine of the class described, capable of performing no sale operations and capable of performing transactions comprising one or more item-entering operations and a final item total operation, the combination of a special counter to count no sale operations; a special counter to count item total operations; operable control elements to initiate item-entering operations; operable control elements to initiate item total operations and no sale operations; an operating arm for each special counter; a special counter operating shaft having depressions engageable by the operating arms to operate the corresponding special counters; a selecting lever for each operating arm; a selecting shaft having depressions therein corresponding to the selecting levers, said shaft positionable by the item total and no sale control elements to aline the depressions with the selecting levers; means, effective after the selecting shaft has been positioned, and prior to operation of the operating shaft, to cause the selecting levers to sense for and to engage the depressions in the selecting shaft to move the corresponding operating arms into engaging relationship with the depressions in the operating shaft; shiftable means to alternately free one selecting lever for sensing movement and to simultaneously hold the other sensing lever against sensing movement; means effective in the first item-entering operation of a transaction to shift the shiftable means in one direction to hold the selecting lever for the no sale special counter against sensing movement and to simultaneously render the selecting lever for the item total special counter free for sensing movement to count the final item total operation of said transaction; and means effectuated in an item total operation and operated in an immediately-following no sale operation to shift the shiftable means in the opposite direction to hold the selecting lever for the item total special counter against sensing movement and to simultaneously free the sensing lever for the no sale special counter for sensing movement to count the no sale operation.

8. In a special counter mechanism for a machine of the class described, the combination of a plurality of operable control elements to control operation of the machine; a special increment counter for each control element to count the operation of said control elements; an operating member for each counter; an operating shaft having an operating depression for each operating member, and engageable with said members to operate the coresponding counters; a selecting lever associated with each operating member, and normally effective to hold the corresponding members out of engagement with the depressions in the operating shaft; a selecting shaft having a depression for each selecting lever and engageable thereby to render the corresponding operating members effective; means between the control elements and the selecting shaft, and controlled by the operated control element to position said selecting shaft accordingly, to aline the depression therein corresponding to said operated control element with the corresponding selecting lever; means, effective after the selecting shaft has been positioned and prior to operation of the operating shaft, to cause the selecting lever to sense for and to engage the depression in the selecting shaft to cause the associated operating member to engage the corresponding depression in the operating shaft to operate the corresponding special counter to count the operation of the operated control element; a manually positionable control lever movable from a normal position to various other positions to control the functions of the machine; and means operated by the control lever when moved out of normal position to disable the operation of the sensing and engaging means for the selecting levers, to render the special counters inoperative.

References Cited in the file of this patent
UNITED STATES PATENTS

| | | |
|---|---|---|
| 2,836,362 | Philipp | Mar. 11, 1958 |
| 2,962,209 | Werner | Nov. 29, 1960 |

UNITED STATES PATENT OFFICE
CERTIFICATE OF CORRECTION

Patent No. 3,061,183                      October 30, 1962

John M. Jackson et al.

It is hereby certified that error appears in the above numbered patent requiring correction and that the said Letters Patent should read as corrected below.

Column 10, line 13, for "193" read -- 183 --; line 36, for "counterbroe" read -- counterbore --; column 12, line 40, for "enagge" read -- engage --; column 18, lines 6 and 7, strike out "The lever 332 (FIGS. 4 and 5) carries a stud 348, which cooperates with an inner surface of an arm 349".

Signed and sealed this 26th day of March 1963.

(SEAL)
Attest:

ESTON G. JOHNSON
Attesting Officer

DAVID L. LADD
Commissioner of Patents